United States Patent
Kodaira et al.

(10) Patent No.: US 8,993,086 B2
(45) Date of Patent: Mar. 31, 2015

(54) RECORDABLE OPTICAL RECORDING MEDIUM

(75) Inventors: Takuo Kodaira, Tokyo (JP); Isao Matsuda, Tokyo (JP); Eiji Yamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 14/001,158

(22) PCT Filed: Feb. 9, 2012

(86) PCT No.: PCT/JP2012/052929
§ 371 (c)(1),
(2), (4) Date: Sep. 6, 2013

(87) PCT Pub. No.: WO2012/114885
PCT Pub. Date: Aug. 30, 2012

(65) Prior Publication Data
US 2013/0337270 A1    Dec. 19, 2013

(30) Foreign Application Priority Data

Feb. 24, 2011    (JP) ................................. 2011-038221

(51) Int. Cl.
| G11B 7/24 | (2013.01) |
| G11B 7/2467 | (2013.01) |
| G11B 7/24035 | (2013.01) |
| G11B 7/249 | (2013.01) |

(52) U.S. Cl.
CPC .......... *G11B 7/2467* (2013.01); *G11B 7/24035* (2013.01); *G11B 7/249* (2013.01)
USPC .... 428/64.1; 428/64.4; 428/64.8; 430/270.14

(58) Field of Classification Search
USPC ...................................... 428/64.8; 430/270.14
See application file for complete search history.

(56) References Cited

U.S. PATENT DOCUMENTS

| 2002/0028918 A1 | 3/2002 | Kasada et al. |
| 2005/0287332 A1 | 12/2005 | Uchida et al. |
| 2009/0263611 A1 | 10/2009 | Miyazawa et al. |
| 2010/0002569 A1 | 1/2010 | Nagase et al. |

FOREIGN PATENT DOCUMENTS

| JP | 2002-206061 A | 7/2002 |
| JP | 2006-007573 A | 1/2006 |
| JP | 2007-045147 A | 2/2007 |
| JP | 2007-111887 A | 5/2007 |
| JP | 2008-071439 A | 3/2008 |
| JP | 2010-015612 A | 1/2010 |
| JP | 2010-033667 A | 2/2010 |

OTHER PUBLICATIONS

International Search Report from the International Bureau of WIPO for International Application No. PCT/JP2012/052929 dated May 22, 2012 (2 pages).

*Primary Examiner* — Elizabeth Mulvaney
(74) *Attorney, Agent, or Firm* — Saliwanchik, Lloyd & Eisenschenk

(57) ABSTRACT

A recordable optical recording medium is provided enabling reliably preventing the deterioration of the recording characteristics, even when stored for a long period of time in an environment of high temperature and humidity. A recordable optical recording medium includes a substrate, and on the substrate, a reflective layer, a recording layer, a protective layer, a light transmission layer in a single layer structure having optical transparency, and a hard coat layer. The recording layer is formed by addition of an additive which functions as reducing agent to an azo metal complex dye having a triazole structure.

10 Claims, 1 Drawing Sheet

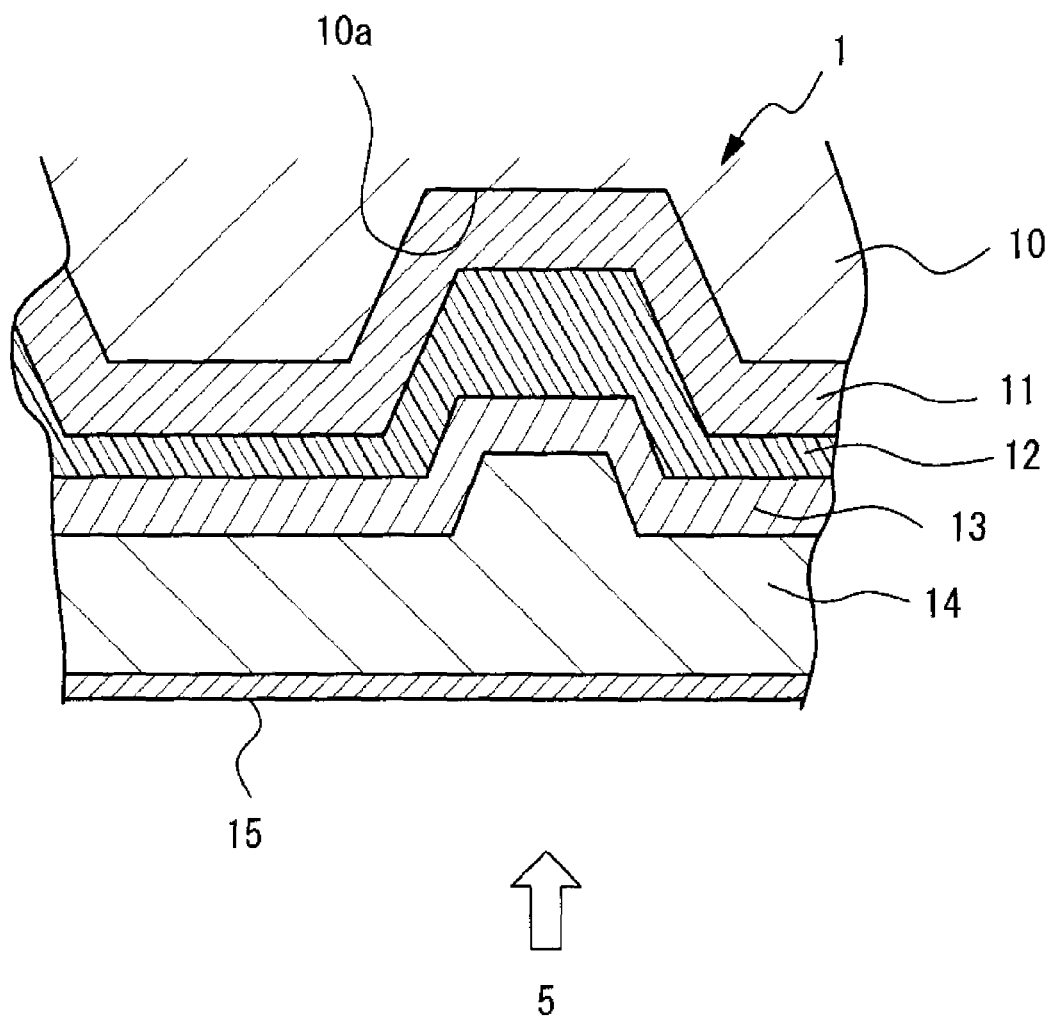

RECORDABLE OPTICAL RECORDING MEDIUM

TECHNICAL FIELD

The present invention relates to an optical recording medium having a recording layer containing an organic dye. More specifically, the present invention relates to an LTH (Low to High) type recordable optical recording medium which has a single-layered light transmission layer and is capable of preventing degradation of the recording characteristics even when stored in an environment of high temperature and humidity.

BACKGROUND ART

In recordable optical recording media, which have a recording layer containing an organic dye, and in which a light transmission layer is formed by coating of a photocurable resin, typically, firstly a layer, in contact with the recording layer, made of a photocurable resin having low elastic modulus of less than 40 MPa at 25° C. is formed; then on the layer of the photocurable resin having low elastic modulus, a layer made of a photocurable resin having high elastic modulus of 40 MPa or more at 25° C. is formed; so that the light transmission layer is formed such that the total thickness of the two photo-curable resin layers is 0.1 mm.

By forming the light transmission layer in such a way, deformations of the recording layer during the recording of the data, to be caused by that the laser beam is irradiated and the organic dye generates heat and decomposes to form a recording mark, can be absorbed and accepted by the layer made of the photocurable resin having low elastic modulus. It is thus able to realize sufficiently high modulation degree. Meanwhile, with the layer made of the photocurable resin having high elastic modulus disposed at the surface of the optical recording medium, it is able to prevent the optical recording medium from scratching.

However, in cases where the light transmission layer is made up of the layer made of the photocurable resin having low elastic modulus and the layer made of the photocurable resin having high elastic modulus in this way, there has been a problem that the optical recording medium is made with many layers and the production cost of the optical recording medium becomes high.

In view of this, by forming the recording layer with the use of an organic dye made of a metal complex compound formed by that an azo compound having a triazole structure is coordinated to a metal ion selected from the group consisting of nickel, cobalt and copper; an optical recording medium made up of only a photocurable resin formed by the photocurable resin having high elastic modulus of 40 MPa or more at 25° C., which has sufficiently high modulation degree and good recording characteristics, without including the photocurable resin having low elastic modulus of less than 40 MPa at 25° C., has been proposed.

Patent Document 1: Japanese Patent Application Laid-open No. 2010-33667

SUMMARY OF INVENTION

Problem to be Solved by the Invention

However, it was found that the recording characteristics deteriorate remarkably when stored in an environment of high temperature and humidity, in the optical recording medium, in which, the recording layer is formed by the above-mentioned metal complex compound (hereinafter, referred to as an "azo metal complex dye having a triazole structure") formed by that the azo compound having a triazole structure is coordinated to the metal ion selected from the group consisting of nickel, cobalt and copper; and a reflective layer is formed by Ag alloy.

Accordingly, an object of the present invention is to provide a recordable optical recording medium having a recording layer formed by an azo metal complex dye having a triazole structure; and a reflective layer formed by Ag or Ag alloy; which recordable optical recording medium is capable of reliably preventing the deterioration of the recording characteristics, even when stored for a long period of time in an environment of high temperature and humidity.

Means for Solving the Problem

The present inventors have performed the following in order to investigate the causes of the deterioration of the recording characteristics of the optical recording medium in which, the recording layer is formed by the azo metal complex dye having a triazole structure; and the reflective layer is formed by Ag alloy, when the optical recording medium is stored in an environment of high temperature and humidity. On a reflective layer formed by Ag or Ag alloy, a recording layer was formed, with the use of an azo metal complex dye that does not have the triazole structure, to prepare an optical recording medium sample A; and the sample A was stored for a predetermined period of time in an environment of high temperature and humidity. After this, the recording layer was washed using 2,2,3,3-tetrafluoro-1-propanol (TFP). On a reflective layer formed by Ag or Ag alloy, a recording layer was formed, with the use of an azo metal complex dye having a triazole structure, to prepare an optical recording medium sample B; and without exposing the sample B to the environment of high temperature and humidity, the recording layer was washed using 2,2,3,3-tetrafluoro-1-propanol (TFP). In these cases, the recording layers were able to be dissolved in 2,2,3,3-tetrafluoro-1-propanol (TFP) to be removed from the reflective layers. On the other hand, on the reflective layer formed by Ag or Ag alloy, a recording layer was formed, with the use of the same azo metal complex dye having a triazole structure as one used for preparing the optical recording medium sample B, to prepare an optical recording medium sample C; and the sample C was stored for a predetermined period of time in the environment of high temperature and humidity. After this, when this recording layer was washed using 2,2,3,3-tetrafluoro-1-propanol (TFP), the recording layer was not dissolved in 2,2,3,3-tetrafluoro-1-propanol (TFP), and thus it was found that the recording layer had been modified.

Then, by TOF-SIMS (Time of Flight-Secondary Ion Mass Spectrometry) analysis, the present inventors have further researched the way how the recording layer was modified. From the recording layer before the optical recording medium in which the recording layer had been formed with the use of an azo metal complex dye having a triazole structure on the reflective layer formed by Ag or Ag alloy was exposed in the environment of high temperature and humidity, molecular ions of the azo metal complex dye that make up the recording layer were detected. In contrast, it was found that from the recording layer after exposing the same optical recording medium in the environment of high temperature and humidity, the molecular ions of the azo metal complex dye that make up the recording layer were not detected, and that from a surface of the recording layer on the side opposite to the reflective layer, Ag ions were detected. It was found that when the optical recording medium in which the recording layer had been formed with the use of the azo metal complex dye having a triazole structure on the reflective layer formed by Ag or Ag alloy was exposed in the environment of high temperature and humidity, the azo metal complex dye having a triazole structure contained in the recording layer would react specifically with the Ag ions generated by oxidation of Ag or Ag alloy contained in the reflective layer, and since the azo metal complex dye having a triazole structure would be modified, this results in remarkable deterioration of the recording characteristics of the optical recording medium.

The present invention is based on such discoveries. The above-mentioned object of the present invention can be achieved by providing a recordable optical recording medium including a substrate on which at least a reflective layer, a recording layer and a light transmission layer are provided, in which, the recording layer is formed by addition of an additive which functions as reducing agent to an azo metal complex dye having a triazole structure represented by the following general formula (1).

[Chemical formula 1]

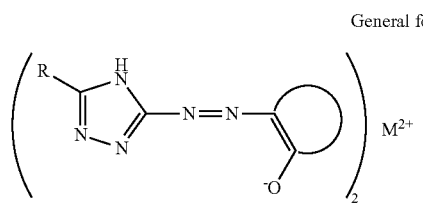

General formula (1)

In the general formula (1), R is a functional group selected from the group consisting of hydrogen, $C_1$-$C_4$ alkyl, benzyl, diethylamido, halogen, trifluoromethyl, methoxy, thiomethyl and N,N-diethyl carbamoyl; M is a metal atom selected from the group consisting of nickel, cobalt and copper. The cyclic part of the general formula (1) is made of carbon, oxygen and hydrogen atoms.

In the present invention, the cyclic part of the general formula (1) preferably has the structure shown by the following general formula (5).

[Chemical formula 2]

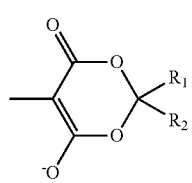

General formula (5)

In the general formula (5), $R_1$ and $R_2$ independently are alkyl, which may have a cyclic structure; which cyclic structure may include a substituent.

In the present invention, preferably, the cyclic part of the azo metal complex dye having a triazole structure represented by the general formula (5) has the structure shown by either of the following general formulae (a) to (j):

[Chemical formula 3]

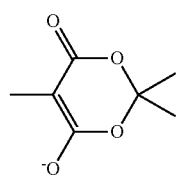

General formula (a)

[Chemical formula 4]

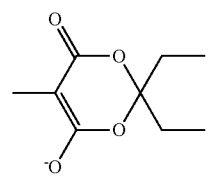

General formula (b)

[Chemical formula 5]

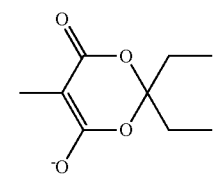

General formula (c)

[Chemical formula 6]

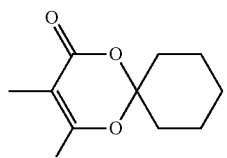

General formula (d)

[Chemical formula 7]

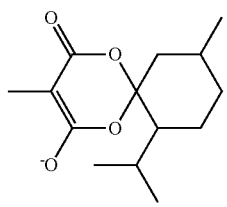

General formula (e)

[Chemical formula 8]

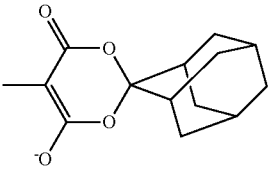

General formula (f)

[Chemical formula 9]

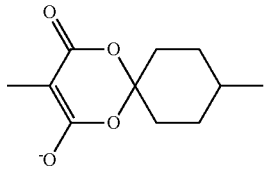

General formula (g)

[Chemical formula 10]

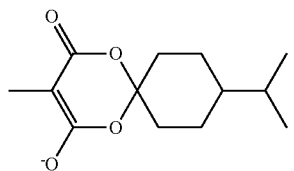

General formula (h)

[Chemical formula 11]

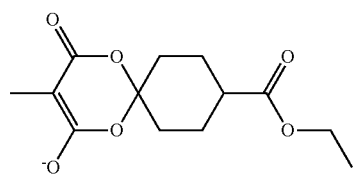

General formula (i)

[Chemical formula 12]

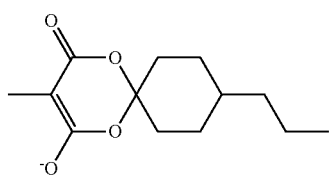

General formula (j)

In the present invention, preferably, the cyclic part of the general formula (1) has the structure shown by either of the following general formulae (k) to (q):

[Chemical formula 13]

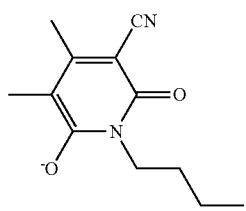

General formula (k)

[Chemical formula 14]

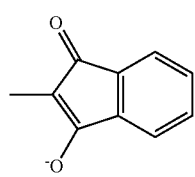

General formula (l)

[Chemical formula 15]

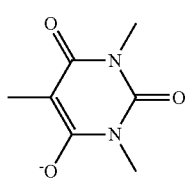

General formula (m)

[Chemical formula 16]

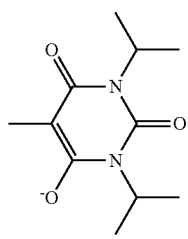

General formula (n)

[Chemical formula 17]

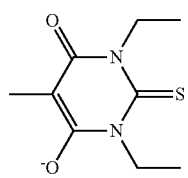

General formula (o)

[Chemical formula 18]

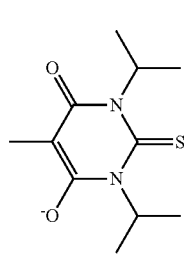

General formula (p)

[Chemical formula 19]

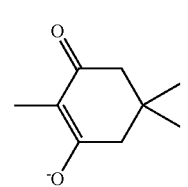

General formula (q)

In the present invention, preferably, as the additive which functions as reducing agent and is added to the azo metal complex dye having a triazole structure, a nitrosodiphenylamine compound represented by the following general formula (10) is used.

[Chemical formula 20]

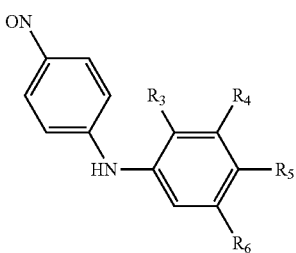

General formula (10)

In the general formula (10), $R_3$ to $R_6$ independently are functional groups selected from the group consisting of hydrogen, $C_1$-$C_2$ alkyl, halogen, trifluoromethyl, dimethylamino, acetamido and nitro.

In the present invention, more preferably, as the additive which functions as reducing agent and is added to the azo metal complex dye having a triazole structure, a nitrosodiphenylamine compound selected from the group consisting of the nitrosodiphenylamine compounds represented by the following structural formulae (11) to (21) is used:

[Chemical formula 21]

Structural formula (11)

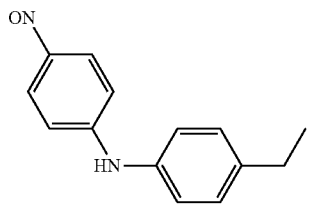

[Chemical formula 22]

Structural formula (12)

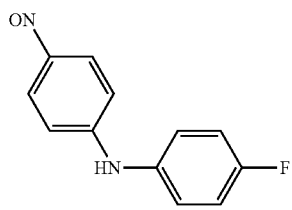

[Chemical formula 23]

Structural formula (13)

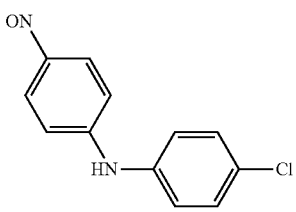

[Chemical formula 24]

Structural formula (14)

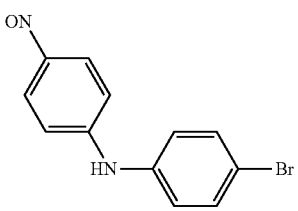

[Chemical formula 25]

Structural formula (15)

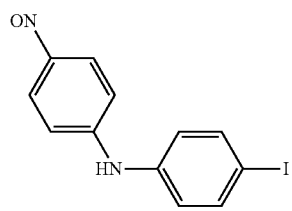

[Chemical formula 26]

Structural formula (16)

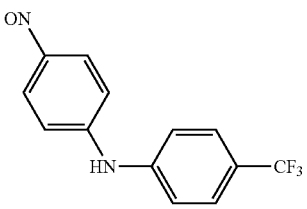

[Chemical formula 27]

Structural formula (17)

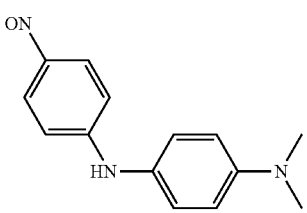

[Chemical formula 28]

Structural formula (18)

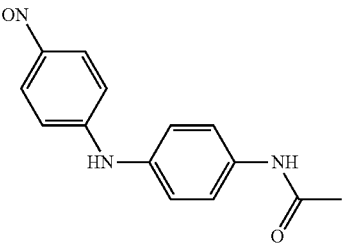

[Chemical formula 29]

Structural formula (19)

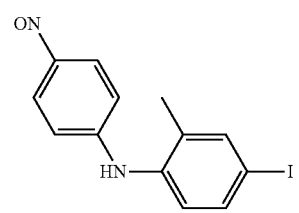

[Chemical formula 30]

Structural formula (20)

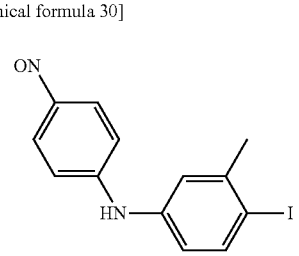

[Chemical formula 31]

Structural formula (21)

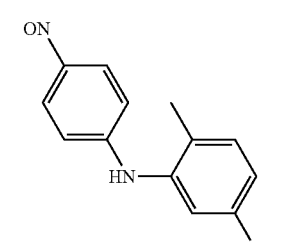

In the present invention, preferably, the azo metal complex dye having a triazole structure has the molecular structure selected from the molecular structures represented by the following structural formulae (31) to (43):

[Chemical formula 32]

Structural formula (31)

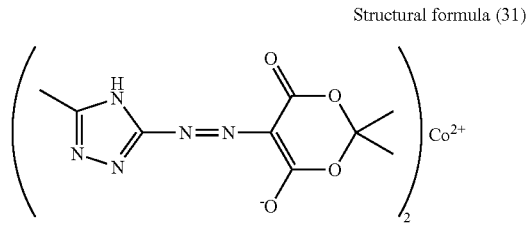

[Chemical formula 33]

Structural formula (32)

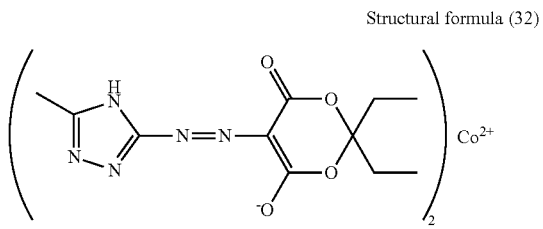

[Chemical formula 34]

Structural formula (33)

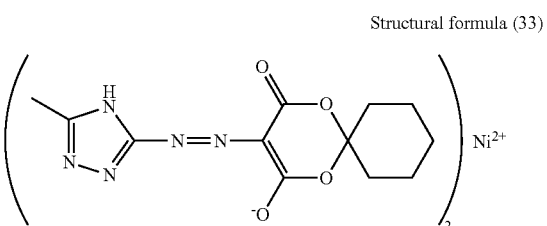

[Chemical formula 35]

Structural formula (34)

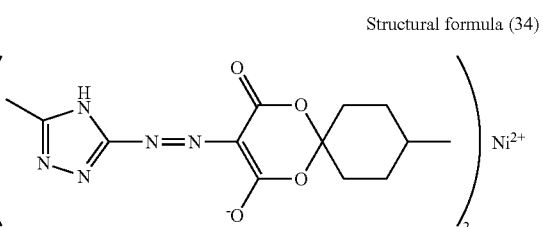

[Chemical formula 36]

Structural formula (35)

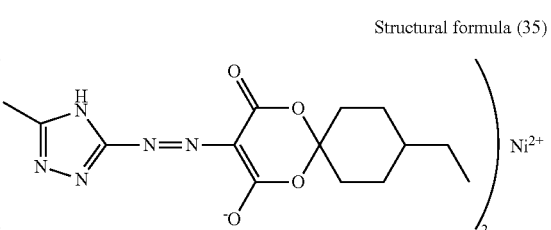

[Chemical formula 37]

Structural formula (36)

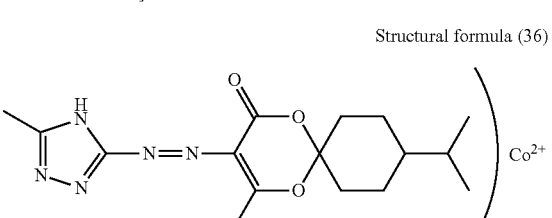

[Chemical formula 38]

Structural formula (37)

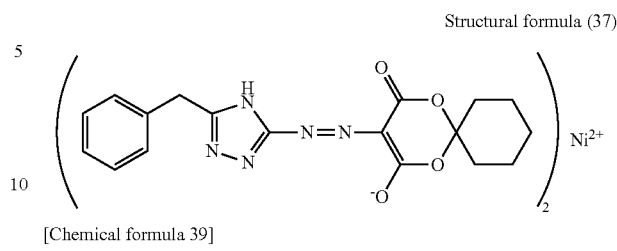

[Chemical formula 39]

Structural formula 38

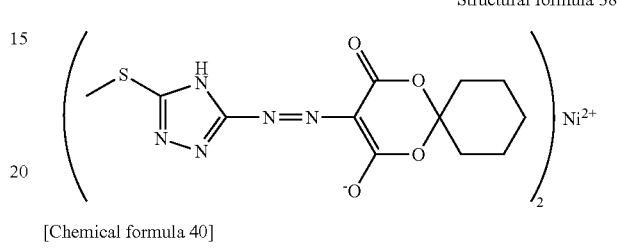

[Chemical formula 40]

Structural formula (39)

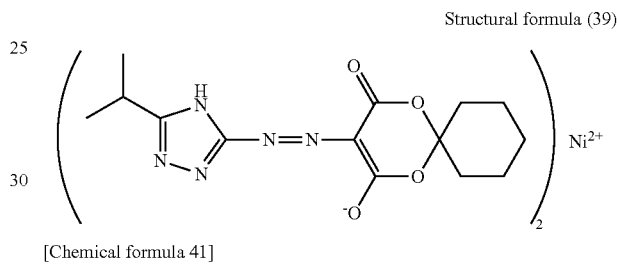

[Chemical formula 41]

Structural formula (40)

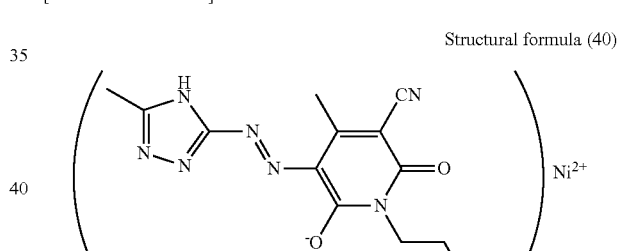

[Chemical formula 42]

Structural formula (41)

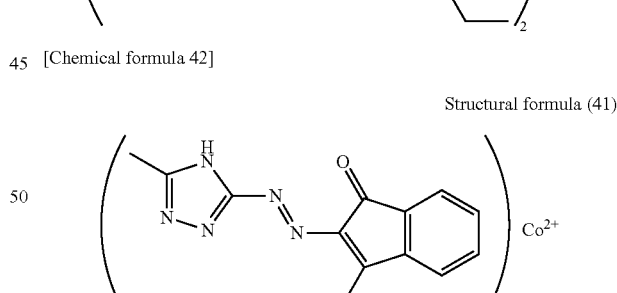

[Chemical formula 43]

Structural formula (42)

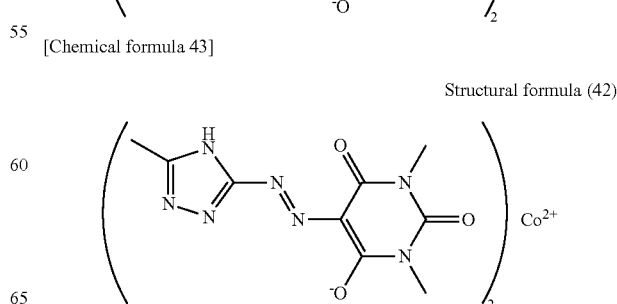

-continued

[Chemical formula 44]

Structural formula (43)

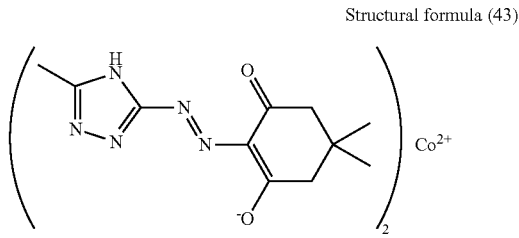

In the present invention, the amount of the additive to be added to the azo metal complex dye having a triazole structure is preferably 1 wt % to 20 wt %. If the added amount of the additive is less than 1 wt %, it is difficult to suppress the deterioration of the recording characteristics of the optical recording medium stored in an environment of high temperature and humidity. Meanwhile, if the added amount of the additive exceeds 20 wt %, the recording and reproducing characteristics of the optical recording medium would deteriorate, which is not desirable.

More preferably, the amount of the additive to be added to the azo metal complex dye having a triazole structure may be 2 wt % to 10 wt %.

According to a preferred embodiment of the present invention, the light transmission layer is made by a single layer.

According to more preferred embodiment of the present invention, the light transmission layer has elastic modulus of from 40 MPa to 10000 MPa at 25° C.

According to a preferred embodiment of the present invention, the recordable optical recording medium includes a hard coat layer formed on a surface of the light transmission layer.

According to a preferred embodiment of the present invention, the recordable optical recording medium includes a protective layer formed by a dielectric material between the recording layer and the light transmission layer.

Effect of the Invention

According to the present invention, it is made possible to provide an LTH (Low to High) type recordable optical recording medium which has a recording layer formed by an azo metal complex dye having a triazole structure; and a reflective layer formed by Ag or Ag alloy; which recordable optical recording medium is capable of reliably preventing the deterioration of the recording characteristics, even when stored for a long period of time in an environment of high temperature and humidity.

BRIEF DESCRIPTION OF THE DRAWING(S)

FIG. 1 is a schematic longitudinal sectional view of a recording medium according to a preferred embodiment of the present invention.

MODES FOR CARRYING OUT THE INVENTION

FIG. 1 is a schematic longitudinal sectional view of an LTH (Low to High) type recordable optical recording medium according to a preferred embodiment of the present invention.

As shown in FIG. 1, the LTH (Low to High) type recordable optical recording medium 1 according to the embodiment includes a substrate 10, and on the substrate 10, a reflective layer 11, a recording layer 12, a protective layer 13, a light transmission layer 14 in a single layer structure having optical transparency, and a hard coat layer 15 are laminated on the substrate 10 in this order.

In the embodiment, a recording laser beam 5 for recording data on the recording layer 12 of the optical recording medium 1 and a reproducing laser beam 5 for reproducing the data recorded on the recording layer 12 are configured such that the optical recording medium 1 is irradiated from a surface of the light transmission layer 14.

Although not shown in FIG. 1, the recordable optical recording medium 1 according to the embodiment has a circular plate shape, and a center hole is formed at a center part.

The substrate 10 has the circular plate shape, functions as a support for assuring a mechanical strength required by the optical recording medium 1, and has a thickness of about 1.1 mm and a diameter of 120 mm.

A material for forming the substrate 10 is not especially limited as long as the mechanical strength required by the optical recording medium 1 can be assured. The substrate 10 may be formed by a metal such as aluminum; glass; ceramics; a resin or the like. Among them, the resin, in particular, a thermoplastic resin is preferably used from the standpoint of formability, moisture resistance, dimensional stability and costs. Examples of the resin for forming the substrate 10 include polycarbonate resin; acrylic resins such as polymethyl methacrylate; vinyl chloride-based resin such as polyvinyl chloride and vinyl chloride copolymer; epoxy resin; amorphous polyolefin resin; polyester resin and the like. Among them, the polycarbonate resin is especially preferred.

As shown in FIG. 1, a spiral guide groove 10a is formed on a surface of the substrate 10. The spiral guide groove 10a can be formed by injection molding the substrate 10 using a mold on which a stamper is set. The guide groove 10a is formed in a pitch of 0.35 μm or 0.32 μm.

As shown in FIG. 1, the reflective layer 11 is formed, by sputtering or the like, on the surface of the substrate 10 at the side where the spiral guide groove 10a has been formed. The reflective layer 11 has a function to reflect the laser beam, which is irradiated to the optical recording medium 1 and transmitted through the recording layer 12, on the recording layer 12, and is generally formed by a metal having high reflectance such as Ag alloy and Al alloy. According to the embodiment, the reflective layer 11 is formed by Ag alloy.

The recording layer 12 is formed on the surface of the reflective layer 11, and is formed by an organic substance containing the organic dye. The recording layer 12 is formed by coating and drying a solution containing the organic dye on the surface of the reflective layer 11 using spin coating.

In the present invention, the recording layer 12 is formed by addition of an additive which functions as reducing agent to an azo metal complex dye having a triazole structure represented by the above-described general formula (1). In the general formula (1), R is a functional group selected from the group consisting of hydrogen, $C_1$-$C_4$ alkyl, benzyl, diethylamido, halogen, trifluoromethyl, methoxy, thiomethyl and N,N-diethyl carbamoyl; M is a metal atom selected from the group consisting of nickel, cobalt and copper.

The cyclic part in the general formula (1) is made of carbon, oxygen and hydrogen atoms. Preferably, the cyclic part in the general formula (1) has the structure represented by the above-described general formula (5). More preferably, the cyclic part in the general formula (1) is selected from the group consisting of the above-described general formulae (a) to (q).

In the present invention, preferably, as the additive which is added to the azo metal complex dye having a triazole structure, a nitrosodiphenylamine compound represented by the above-described general formula (10) is used.

In the present invention, more preferably, as the additive which is added to the azo metal complex dye having a triazole structure, a nitrosodiphenylamine compound selected from the group consisting of the nitrosodiphenylamine compounds represented by the above-described structural formulae (11) to (21) is used.

In the present invention, preferably, the azo metal complex dye having a triazole structure has the molecular structure selected from the molecular structures represented by the above-mentioned structural formulae (31) to (43).

In the present invention, the amount of the additive to be added is preferably 1 wt % to 20 wt %, and more preferably, 2 wt % to 10 wt %.

In the embodiment, the recording layer 12 is formed by adding the nitrosodiphenylamine compound represented by the above-described general formula (10) to the azo metal complex dye having a triazole structure with the molecular structure represented by the above-described general formula (1), dissolving the resultant product to 2,2,3,3-tetrafluoro-1-propanol (TFP), and coating the surface of the reflective layer 11 with the resultant solution by spin coating method. In the embodiment, the solution containing the organic dye is prepared by mixing 90 wt % of the azo metal complex dye having a triazole structure and 10 wt % of the nitrosodiphenylamine compound.

The protective layer 13 is formed on the surface of the recording layer 12.

The protective layer 13 is for preventing a diffusion of the organic dye contained in the recording layer 12 over the light transmission layer 14 when the light transmission layer 14 is formed, and also for preventing a miscible phenomenon that a photocurable resin used when the light transmission layer 14 is formed is permeated into the recording layer 12.

A material for forming the protective layer 13 is not especially limited as long as it is a transparent dielectric material. Examples thereof include oxides such as silicon oxide (silicon dioxide is especially preferred), zinc oxide, cerium oxide, yttrium oxide, indium oxide-tin oxide (ITO); sulfides such as zinc sulfide and yttrium sulfide; nitrides such as silicon nitride; and a mixture of the oxides and a sulfuric compound. In the embodiment, the protective layer 13 is formed by the indium oxide-tin oxide (ITO) by sputtering or the like.

On the surface of the protective layer 13, the light transmission layer 14 in a single layer structure is formed.

The light transmission layer 14 is formed by coating the surface of the protective layer 13 with the photocurable resin, which is cured by ultraviolet rays or radiation, by spin coating method to form a coated film, and by irradiating the coated film with ultraviolet rays or radiation to cure the coated film.

According to the embodiment, the light transmission layer 14 is formed by the photocurable resin having elastic modulus of from 40 MPa to 10000 MPa at 25° C.

In the embodiment, the thickness of the light transmission layer 14 is set such that the combined thickness of the light transmission layer 14 and the hard coat layer 15 formed on the light transmission layer 14 is 100 μm in total.

The light transmission layer 14 has a thickness of 0.1 mm, and has light transmittance to light having a wavelength of 405 nm of 70% or more, preferably 80% or more measured by a spectrophotometer at a wavelength of 405 nm.

As shown in FIG. 1, the hard coat layer 15 is formed on the surface of the light transmission layer 14 so as to physically protect the light transmission layer 14 and prevent the light transmission layer 14 from scratching.

A material for forming the hard coat layer 15 is not especially limited, but a material excellent in transparency and abrasion resistance is preferred. The hard coat layer 15 is preferably formed by coating a resin composition including an ultraviolet curable resin to which inorganic particles are added on the surface of the light transmission layer 14 by spin coating method.

The hard coat layer 15 preferably has a thickness of from 1 μm to 5 μm.

In order to record data on the optical recording medium 1 thus configured, the optical recording medium 1 is irradiated with the laser beam 5 having a wavelength of 350 nm to 500 nm from the light transmission layer 14 side. The laser beam 5 is transmitted through the single-layered light transmission layer 14 and the protective layer 13 and is incident on the recording layer 12; or is transmitted through the recording layer 12, is reflected by the reflective layer 11, and is incident on the recording layer 12.

As a result, the organic dye contained in the part of the recording layer 12 irradiated with the laser beam 5 is decomposed. The reflectance of this part is increased. In this way, the recoding mark is formed and the data is written into the optical recording medium 1.

According to the embodiment, as the recording layer 12 formed on the surface of the reflective layer 11 contains 90 wt % of the azo metal complex dye having a triazole structure and 10 wt % of the nitrosodiphenylamine compound as the additive, it is made possible to effectively prevent the oxidation and ionization of the Ag alloy contained in the reflective layer 11 caused by being reacted with the azo metal complex dye having a triazole structure, when stored in an environment of high temperature and humidity. Thus, the optical recording medium 1 is capable of effectively preventing the deterioration of the recording and reproducing characteristics, even when stored for a long period of time in an environment of high temperature and humidity.

EXAMPLES

Examples and Comparative Examples will be given below to make the effect of the present invention more apparent.

Example 1

A circular plate shaped substrate was injection molded from a polycarbonate resin having an outer diameter of 120 mm and a thickness of 1.1 mm on which a spiral guide groove was formed at a pitch of 0.32 μm.

A Ag alloy reflective layer was formed on a surface of the substrate at the side of the guide groove formed, and a track corresponding to the guide groove having a depth of 45 nm and a width of 160 nm was formed at a surface of the reflective layer.

Next, 10 wt % of the nitrosodiphenylamine compound represented by the above-described structural formula (15) was added to and mixed with 90 wt % of the azo metal complex dye having a triazole structure represented by the above-described structural formula (31), and the resultant mixture was dissolved into 2,2,3,3-tetrafluoro-1-propanol (TFP) to prepare an organic dye solution. The resultant organic dye solution was coated on the surface of the reflective layer by spin coating method to form a coated film. The coated film was dried at a temperature of 80° C. for 10 minutes to form a recording layer such that an optical density or absorbance (an OD value) was 0.25 at a maximum absorption wavelength ($\lambda$max=370 nm). Herein, the optical density or absorbance (OD value) refers to the optical density of the substrate on which the recording layer is directly formed on the substrate without forming the reflective film, on the assumption that the optical density of the substrate alone is zero.

Further, a protective layer containing indium oxide-tin oxide (ITO) was formed on the surface of the recording layer at a thickness of 20 nm by sputtering.

Next, an acrylic resin based ultraviolet curable resin was coated on the surface of the protective layer by spin coating method to from a coated film. The coated film was irradiated with ultraviolet rays, and cured, thereby forming a single-layered light transmission layer having a thickness of 97 µm. After curing, the light transmission layer had elastic modulus of 2300 MPa at 25° C. For measurement of elasticity, a dynamic viscoelasticity measuring apparatus RMAIII manufactured by TA Instruments was used. A test specimen was provided by coating a sample resin on a disc at 100 µm, curing it, peeling the resin from the disc, and cutting into a size of 5 mm×50 mm.

Further, a resin composition including an ultraviolet curable resin to which inorganic particles were added was coated on the surface of the light transmission layer by spin coating method to form a coated film. The coated film was irradiated with ultraviolet rays, and cured, thereby forming a hard coat layer having a thickness of 3 µm.

Thus, an optical recording medium sample #1 was prepared.

Next, the obtained optical recording medium sample #1 was set to a data recording and reproducing apparatus "ODU-1000" (trade name) manufactured by Pulstec Industrial Co., Ltd.; and by irradiating the recording layer with the laser beam having a wavelength of 405 nm via the light transmission layer using an objective lens having an NA of 0.85, varying the power of the laser beam, while turning the sample at a line speed of 9.83 m/sec (2-speed recording), the data was recorded.

By the data thus recorded on the optical recording medium sample #1, a recording signal was reproduced using the above-described data recording and reproducing apparatus, with the power of the laser beam fixed to 0.35 mW, and the reproducing characteristics were evaluated. The power of the laser beam (optimum laser power) where the R-SER of the reproduction signal became the smallest was 4.9 mW, and the R-SER in this case was $4.3 \times 10^{-4}$.

Further, the optical recording medium sample #1 was allowed to stand in an environment of high temperature and humidity, at a temperature of 80° C. and a humidity of 80%, for 100 hours, to conduct high temperature and high humidity test conforming to ISO.

Next, by using the above-described data recording and reproducing apparatus, with the power of the laser beam fixed to 0.35 mW, the data recorded on the optical recording medium sample #1 after undergoing the high temperature and high humidity test was reproduced and the reproduction signal was evaluated. The R-SER was $1.1 \times 10^{-3}$.

Thus, while the R-SER before the high temperature and high humidity test was $4.3 \times 10^{-4}$, the R-SER after the high temperature and high humidity test was $1.1 \times 10^{-3}$, that is, the deterioration of R-SER by the high temperature and high humidity test was within 10 times. Therefore, the deterioration of the recording and reproducing characteristics of the optical recording medium sample #1, by the high temperature and high humidity test, was well within an acceptable range.

Example 2

An optical recording medium sample #2 was prepared in the same manner as in Example 1 except that the azo metal complex dye having a triazole structure represented by the above-described structural formula (32) was used in place of the azo metal complex dye having a triazole structure represented by the above-described structural formula (31) and that the recording layer was formed such that the optical density (the OD value) at the maximum absorption wavelength ($\lambda$max=373 nm) was 0.25.

The optical recording medium sample #2 thus prepared was set to the data recording and reproducing apparatus which was used in Example 1, and data was recorded on the optical recording medium sample #2 in the same manner as in Example 1. When the recorded data was reproduced, with the power of the laser beam fixed to 0.35 mW, the power of the laser beam (optimum laser power) where the R-SER of the reproduction signal became the smallest was 4.9 mW, and the R-SER in this case was $6.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #2 after undergoing the high temperature and high humidity test was reproduced and the reproduction signal was evaluated. The R-SER was $9.9 \times 10^{-4}$.

Thus, the deterioration of R-SER by the high temperature and high humidity test was within 10 times, and the deterioration of the recording and reproducing characteristics of the optical recording medium sample #2, by the high temperature and high humidity test, was well within an acceptable range.

Example 3

An optical recording medium sample #3 was prepared in the same manner as in Example 1 except that the azo metal complex dye having a triazole structure represented by the above-described structural formula (33) was used in place of the azo metal complex dye having a triazole structure represented by the above-described structural formula (31) and that the recording layer was formed such that the optical density (the OD value) at the maximum absorption wavelength ($\lambda$max=379 nm) was 0.25.

The optical recording medium sample #3 thus prepared was set to the data recording and reproducing apparatus which was used in Example 1, and data was recorded on the optical recording medium sample #3 in the same manner as in Example 1. When the recorded data was reproduced, with the power of the laser beam fixed to 0.35 mW, the power of the laser beam (optimum laser power) where the DC jitter and the R-SER of the reproduction signal became the smallest was 4.7 mW, and the R-SER in this case was $3.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #3 after undergoing the high temperature and high humidity test was reproduced and the reproduction signal was evaluated. The R-SER was $1.1 \times 10^{-3}$.

Thus, the deterioration of R-SER by the high temperature and high humidity test was within 10 times, and the deterioration of the recording and reproducing characteristics of the optical recording medium sample #3, by the high temperature and high humidity test, was well within an acceptable range.

Example 4

An optical recording medium sample #4 was prepared in the same manner as in Example 1 except that the azo metal complex dye having a triazole structure represented by the above-described structural formula (34) was used in place of the azo metal complex dye having a triazole structure represented by the above-described structural formula (31) and that the recording layer was formed such that the optical density (the OD value) at the maximum absorption wavelength ($\lambda$max=379 nm) was 0.25.

The optical recording medium sample #4 thus prepared was set to the data recording and reproducing apparatus which was used in Example 1, and data was recorded on the optical recording medium sample #4 in the same manner as in Example 1. When the recorded data was reproduced, with the power of the laser beam fixed to 0.35 mW, the power of the laser beam (optimum laser power) where the DC jitter and the R-SER of the reproduction signal became the smallest was 4.5 mW, and the R-SER in this case was $3.6 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #4 after undergoing the high temperature and high humidity test was reproduced and the reproduction signal was evaluated. The R-SER was $7.6 \times 10^{-4}$.

Thus, the deterioration of R-SER by the high temperature and high humidity test was within 10 times, and the deterioration of the recording and reproducing characteristics of the optical recording medium sample #4, by the high temperature and high humidity test, was well within an acceptable range.

Example 5

An optical recording medium sample #5 was prepared in the same manner as in Example 1 except that the azo metal complex dye having a triazole structure represented by the above-described structural formula (35) was used in place of the azo metal complex dye having a triazole structure represented by the above-described structural formula (31) and that the recording layer was formed such that the optical density (the OD value) at the maximum absorption wavelength ($\lambda$max=383 nm) was 0.25.

The optical recording medium sample #5 thus prepared was set to the data recording and reproducing apparatus which was used in Example 1, and data was recorded on the optical recording medium sample #5 in the same manner as in Example 1. When the recorded data was reproduced, with the power of the laser beam fixed to 0.35 mW, the power of the laser beam (optimum laser power) where the R-SER of the reproduction signal became the smallest was 4.6 mW, and the R-SER in this case was $4.4 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #5 after undergoing the high temperature and high humidity test was reproduced and the reproduction signal was evaluated. The R-SER was $8.4 \times 10^{-4}$.

Thus, the deterioration of R-SER by the high temperature and high humidity test was within 10 times, and the deterioration of the recording and reproducing characteristics of the optical recording medium sample #5, by the high temperature and high humidity test, was well within an acceptable range.

Example 6

An optical recording medium sample #6 was prepared in the same manner as in Example 1 except that the azo metal complex dye having a triazole structure represented by the above-described structural formula (36) was used in place of the azo metal complex dye having a triazole structure represented by the above-described structural formula (31) and that the recording layer was formed such that the optical density (the OD value) at the maximum absorption wavelength ($\lambda$max=374 nm) was 0.25.

The optical recording medium sample #6 thus prepared was set to the data recording and reproducing apparatus which was used in Example 1, and data was recorded on the optical recording medium sample #6 in the same manner as in Example 1. When the recorded data was reproduced, with the power of the laser beam fixed to 0.35 mW, the power of the laser beam (optimum laser power) where the R-SER of the reproduction signal became the smallest was 4.8 mW, and the R-SER in this case was $2.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #6 after undergoing the high temperature and high humidity test was reproduced and the reproduction signal was evaluated. The R-SER was $7.2 \times 10^{-4}$.

Thus, the deterioration of R-SER by the high temperature and high humidity test was within 10 times, and the deterioration of the recording and reproducing characteristics of the optical recording medium sample #6, by the high temperature and high humidity test, was well within an acceptable range.

Example 7

An optical recording medium sample #7 was prepared in the same manner as in Example 1 except that the azo metal complex dye having a triazole structure represented by the above-described structural formula (37) was used in place of the azo metal complex dye having a triazole structure represented by the above-described structural formula (31) and that the recording layer was formed such that the optical density (the OD value) at the maximum absorption wavelength ($\lambda$max=381 nm) was 0.25.

The optical recording medium sample #7 thus prepared was set to the data recording and reproducing apparatus which was used in Example 1, and data was recorded on the optical recording medium sample #7 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $3.6 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #7 after undergoing the high temperature and high humidity test was reproduced and the reproduction signal was evaluated. The R-SER was $7.8 \times 10^{-4}$.

Thus, the deterioration of R-SER by the high temperature and high humidity test was within 10 times, and the deterioration of the recording and reproducing characteristics of the optical recording medium sample #7, by the high temperature and high humidity test, was well within an acceptable range.

Example 8

An optical recording medium sample #8 was prepared in the same manner as in Example 1 except that the azo metal complex dye having a triazole structure represented by the above-described structural formula (38) was used in place of the azo metal complex dye having a triazole structure represented by the above-described structural formula (31) and that the recording layer was formed such that the optical density (the OD value) at the maximum absorption wavelength ($\lambda$max=391 nm) was 0.25.

The optical recording medium sample #8 thus prepared was set to the data recording and reproducing apparatus which was used in Example 1, and data was recorded on the optical recording medium sample #8 in the same manner as in Example 1. When the recorded data was reproduced, with the power of the laser beam fixed to 0.35 mW, the power of the laser beam (optimum laser power) where the R-SER of the reproduction signal became the smallest was 4.6 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #8 after undergoing the high temperature and high humidity test was reproduced and the reproduction signal was evaluated. The R-SER was $8.6 \times 10^{-4}$.

Thus, the deterioration of R-SER by the high temperature and high humidity test was within 10 times, and the deterioration of the recording and reproducing characteristics of the optical recording medium sample #8, by the high temperature and high humidity test, was well within an acceptable range.

Example 9

An optical recording medium sample #9 was prepared in the same manner as in Example 1 except that the azo metal complex dye having a triazole structure represented by the above-described structural formula (39) was used in place of the azo metal complex dye having a triazole structure represented by the above-described structural formula (31) and that the recording layer was formed such that the optical density (the OD value) at the maximum absorption wavelength ($\lambda$max=385 nm) was 0.25.

The optical recording medium sample #9 thus prepared was set to the data recording and reproducing apparatus which was used in Example 1, and data was recorded on the optical recording medium sample #9 in the same manner as in Example 1. When the recorded data was reproduced, with the power of the laser beam fixed to 0.35 mW, the power of the laser beam (optimum laser power) where the R-SER of the reproduction signal became the smallest was 4.5 mW, and the R-SER in this case was $3.9 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #9 after undergoing the high temperature and high humidity test was reproduced and the reproduction signal was evaluated. The R-SER was $1.1 \times 10^{-3}$.

Thus, the deterioration of R-SER by the high temperature and high humidity test was within 10 times, and the deterioration of the recording and reproducing characteristics of the optical recording medium sample #9, by the high temperature and high humidity test, was well within an acceptable range.

Example 10

An optical recording medium sample #10 was prepared in the same manner as in Example 1 except that the azo metal complex dye having a triazole structure represented by the above-described structural formula (40) was used in place of the azo metal complex dye having a triazole structure represented by the above-described structural formula (31) and that the recording layer was formed such that the optical density (the OD value) at the maximum absorption wavelength ($\lambda$max=441 nm) was 0.21.

The optical recording medium sample #10 thus prepared was set to the data recording and reproducing apparatus which was used in Example 1, and data was recorded on the optical recording medium sample #10 in the same manner as in Example 1. When the recorded data was reproduced, with the power of the laser beam fixed to 0.35 mW, the power of the laser beam (optimum laser power) where the R-SER of the reproduction signal became the smallest was 5.7 mW, and the R-SER in this case was $1.4 \times 10^{-3}$.

Further, the high temperature and high humidity test conforming to ISO was conducted; and by using the above-described data recording and reproducing apparatus, with the power of the laser beam fixed to 0.35 mW, the data recorded on the optical recording medium sample #10 after undergoing the high temperature and high humidity test was reproduced and the reproduction signal was evaluated. The R-SER was $5.2 \times 10^{-3}$.

Thus, the deterioration of R-SER by the high temperature and high humidity test was within 10 times, and the deterioration of the recording and reproducing characteristics of the optical recording medium sample #10, by the high temperature and high humidity test, was well within an acceptable range.

Example 11

An optical recording medium sample #2 was prepared in the same manner as in Example 1 except that the azo metal complex dye having a triazole structure represented by the above-described structural formula (41) was used in place of the azo metal complex dye having a triazole structure represented by the above-described structural formula (31) and that the recording layer was formed such that the optical density (the OD value) at the maximum absorption wavelength ($\lambda$max=427 nm) was 0.22.

The optical recording medium sample #11 thus prepared was set to the data recording and reproducing apparatus which was used in Example 1, and data was recorded on the optical recording medium sample #11 in the same manner as in Example 1. When the recorded data was reproduced, with the power of the laser beam fixed to 0.35 mW, the power of the laser beam (optimum laser power) where the R-SER of the reproduction signal became the smallest was 6.2 mW, and the R-SER in this case was $1.1 \times 10^{-3}$.

Further, the high temperature and high humidity test conforming to ISO was conducted; and by using the above-described data recording and reproducing apparatus, with the power of the laser beam fixed to 0.35 mW, the data recorded on the optical recording medium sample #11 after undergoing the high temperature and high humidity test was reproduced and the reproduction signal was evaluated. The R-SER was $6.9 \times 10^{-3}$.

Thus, the deterioration of R-SER by the high temperature and high humidity test was within 10 times, and the deterioration of the recording and reproducing characteristics of the optical recording medium sample #11, by the high temperature and high humidity test, was well within an acceptable range.

Example 12

An optical recording medium sample #12 was prepared in the same manner as in Example 1 except that the azo metal complex dye having a triazole structure represented by the above-described structural formula (42) was used in place of the azo metal complex dye having a triazole structure represented by the above-described structural formula (31) and that the recording layer was formed such that the optical density (the OD value) at the maximum absorption wavelength (λmax=396 nm) was 0.21.

The optical recording medium sample #12 thus prepared was set to the data recording and reproducing apparatus which was used in Example 1, and data was recorded on the optical recording medium sample #12 in the same manner as in Example 1. When the recorded data was reproduced, with the power of the laser beam fixed to 0.35 mW, the power of the laser beam (optimum laser power) where the R-SER of the reproduction signal became the smallest was 5.2 mW, and the R-SER in this case was $9.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #12 after undergoing the high temperature and high humidity test was reproduced and the reproduction signal was evaluated. The R-SER was $3.9 \times 10^{-3}$.

Thus, the deterioration of R-SER by the high temperature and high humidity test was within 10 times, and the deterioration of the recording and reproducing characteristics of the optical recording medium sample #12, by the high temperature and high humidity test, was well within an acceptable range.

Example 13

An optical recording medium sample #13 was prepared in the same manner as in Example 1 except that the azo metal complex dye having a triazole structure represented by the above-described structural formula (43) was used in place of the azo metal complex dye having a triazole structure represented by the above-described structural formula (31) and that the recording layer was formed such that the optical density (the OD value) at the maximum absorption wavelength (λmax=394 nm) was 0.22.

The optical recording medium sample #13 thus prepared was set to the data recording and reproducing apparatus which was used in Example 1, and data was recorded on the optical recording medium sample #13 in the same manner as in Example 1. When the recorded data was reproduced, with the power of the laser beam fixed to 0.35 mW, the power of the laser beam (optimum laser power) where the R-SER of the reproduction signal became the smallest was 5.0 mW, and the R-SER was $7.6 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #13 after undergoing the high temperature and high humidity test was reproduced and the reproduction signal was evaluated. The R-SER was $2.1 \times 10^{-3}$.

Thus, the deterioration of R-SER by the high temperature and high humidity test was within 10 times, and the deterioration of the recording and reproducing characteristics of the optical recording medium sample #13, by the high temperature and high humidity test, was well within an acceptable range.

Example 14

An optical recording medium sample #14 was prepared in the same manner as in Example 1 except that the nitroso-diphenylamine compound represented by the above-described structural formula (11) was used in place of the nitrosodiphenylamine compound represented by the above-described structural formula (15) and that the recording layer was formed such that the optical density (the OD value) at the maximum absorption wavelength (λmax=370 nm) was 0.25.

The optical recording medium sample #14 thus prepared was set to the data recording and reproducing apparatus which was used in Example 1, and data was recorded on the optical recording medium sample #14 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #14 after undergoing the high temperature and high humidity test was reproduced and the reproduction signal was evaluated. The R-SER was $8.2 \times 10^{-4}$.

Thus, the deterioration of R-SER by the high temperature and high humidity test was within 10 times, and the deterioration of the recording and reproducing characteristics of the optical recording medium sample #14, by the high temperature and high humidity test, was well within an acceptable range.

Example 15

An optical recording medium sample #15 was prepared in the same manner as in Example 1 except that the nitrosodiphenylamine compound represented by the above-described structural formula (12) was used in place of the nitrosodiphenylamine compound represented by the above-described structural formula (15) and that the recording layer was formed such that the optical density (the OD value) at the maximum absorption wavelength (λmax=370 nm) was 0.25.

The optical recording medium sample #15 thus prepared was set to the data recording and reproducing apparatus which was used in Example 1, and data was recorded on the optical recording medium sample #15 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $3.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #15 after undergoing the high temperature and high humidity test was reproduced and the reproduction signal was evaluated. The R-SER was $6.4 \times 10^{-4}$.

Thus, the deterioration of R-SER by the high temperature and high humidity test was within 10 times, and the deterioration of the recording and reproducing characteristics of the optical recording medium sample #15, by the high temperature and high humidity test, was well within an acceptable range.

Example 16

An optical recording medium sample #16 was prepared in the same manner as in Example 1 except that the nitrosodiphenylamine compound represented by the above-described structural formula (13) was used in place of the nitrosodiphenylamine compound represented by the above-described structural formula (15) and that the recording layer was formed such that the optical density (the OD value) at the maximum absorption wavelength (λmax=370 nm) was 0.25.

The optical recording medium sample #16 thus prepared was set to the data recording and reproducing apparatus which was used in Example 1, and data was recorded on the optical recording medium sample #16 in the same manner as in Example 1. When the recorded data was reproduced, with the power of the laser beam fixed to 0.35 mW, the power of the laser beam (optimum laser power) where the R-SER of the reproduction signal became the smallest was 4.4 mW, and the R-SER in this case was $3.6 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #16 after undergoing the high temperature and high humidity test was reproduced and the reproduction signal was evaluated. The R-SER was $8.4 \times 10^{-4}$.

Thus, the deterioration of R-SER by the high temperature and high humidity test was within 10 times, and the deterioration of the recording and reproducing characteristics of the optical recording medium sample #16, by the high temperature and high humidity test, was well within an acceptable range.

Example 17

An optical recording medium sample #17 was prepared in the same manner as in Example 1 except that the nitrosodiphenylamine compound represented by the above-described structural formula (14) was used in place of the nitrosodiphenylamine compound represented by the above-described structural formula (15) and that the recording layer was formed such that the optical density (the OD value) at the maximum absorption wavelength (λmax=370 nm) was 0.25.

The optical recording medium sample #17 thus prepared was set to the data recording and reproducing apparatus which was used in Example 1, and data was recorded on the optical recording medium sample #17 in the same manner as in Example 1. When the recorded data was reproduced, with the power of the laser beam fixed to 0.35 mW, the power of the laser beam (optimum laser power) where the R-SER of the reproduction signal became the smallest was 4.6 mW, and the R-SER in this case was $3.5 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #17 after undergoing the high temperature and high humidity test was reproduced and the reproduction signal was evaluated. The R-SER was $9.8 \times 10^{-4}$.

Thus, the deterioration of R-SER by the high temperature and high humidity test was within 10 times, and the deterioration of the recording and reproducing characteristics of the optical recording medium sample #17, by the high temperature and high humidity test, was well within an acceptable range.

Example 18

An optical recording medium sample #18 was prepared in the same manner as in Example 1 except that the nitroso-diphenylamine compound represented by the above-described structural formula (16) was used in place of the nitrosodiphenylamine compound represented by the above-described structural formula (15) and that the recording layer was formed such that the optical density (the OD value) at the maximum absorption wavelength (λmax=370 nm) was 0.25.

The optical recording medium sample #18 thus prepared was set to the data recording and reproducing apparatus which was used in Example 1, and data was recorded on the optical recording medium sample #18 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $5.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #18 after undergoing the high temperature and high humidity test was reproduced and the reproduction signal was evaluated. The R-SER was $8.9 \times 10^{-4}$.

Thus, the deterioration of R-SER by the high temperature and high humidity test was within 10 times, and the deterioration of the recording and reproducing characteristics of the optical recording medium sample #18, by the high temperature and high humidity test, was well within an acceptable range.

Example 19

An optical recording medium sample #19 was prepared in the same manner as in Example 1 except that the nitrosodiphenylamine compound represented by the above-described structural formula (17) was used in place of the nitrosodiphenylamine compound represented by the above-described structural formula (15) and that the recording layer was formed such that the optical density (the OD value) at the maximum absorption wavelength (λmax=370 nm) was 0.25.

The optical recording medium sample #19 thus prepared was set to the data recording and reproducing apparatus which was used in Example 1, and data was recorded on the optical recording medium sample #19 in the same manner as in Example 1. When the recorded data was reproduced, with the power of the laser beam fixed to 0.35 mW, the power of the laser beam (optimum laser power) where the R-SER of the reproduction signal became the smallest was 4.8 mW, and the R-SER was $3.7 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #19 after undergoing the high temperature and high humidity test was reproduced and the reproduction signal was evaluated. The R-SER was $9.2 \times 10^{-4}$.

Thus, the deterioration of R-SER by the high temperature and high humidity test was within 10 times, and the deterioration of the recording and reproducing characteristics of the optical recording medium sample #19, by the high temperature and high humidity test, was well within an acceptable range.

Example 20

An optical recording medium sample #20 was prepared in the same manner as in Example 1 except that the nitrosodiphenylamine compound represented by the above-described structural formula (18) was used in place of the nitrosodiphenylamine compound represented by the above-described structural formula (15) and that the recording layer was formed such that the optical density (the OD value) at the maximum absorption wavelength ($\lambda$max=370 nm) was 0.25.

The optical recording medium sample #20 thus prepared was set to the data recording and reproducing apparatus which was used in Example 1, and data was recorded on the optical recording medium sample #20 in the same manner as in Example 1. When the recorded data was reproduced, with the power of the laser beam fixed to 0.35 mW, the power of the laser beam (optimum laser power) where the R-SER of the reproduction signal became the smallest was 4.5 mW, and the R-SER in this case was $2.4\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #20 after undergoing the high temperature and high humidity test was reproduced and the reproduction signal was evaluated. The R-SER was $8.2\times10^{-4}$.

Thus, the deterioration of R-SER by the high temperature and high humidity test was within 10 times, and the deterioration of the recording and reproducing characteristics of the optical recording medium sample #20, by the high temperature and high humidity test, was well within an acceptable range.

Example 21

An optical recording medium sample #21 was prepared in the same manner as in Example 1 except that the nitrosodiphenylamine compound represented by the above-described structural formula (19) was used in place of the nitrosodiphenylamine compound represented by the above-described structural formula (15) and that the recording layer was formed such that the optical density (the OD value) at the maximum absorption wavelength ($\lambda$max=370 nm) was 0.25.

The optical recording medium sample #21 thus prepared was set to the data recording and reproducing apparatus which was used in Example 1, and data was recorded on the optical recording medium sample #21 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $5.6\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #21 after undergoing the high temperature and high humidity test was reproduced and the reproduction signal was evaluated. The R-SER was $1.4\times10^{-3}$.

Thus, the deterioration of R-SER by the high temperature and high humidity test was within 10 times, and the deterioration of the recording and reproducing characteristics of the optical recording medium sample #21, by the high temperature and high humidity test, was well within an acceptable range.

Example 22

An optical recording medium sample #22 was prepared in the same manner as in Example 1 except that the nitroso-diphenylamine compound represented by the above-described structural formula (20) was used in place of the nitrosodiphenylamine compound represented by the above-described structural formula (15) and that the recording layer was formed such that the optical density (the OD value) at the maximum absorption wavelength ($\lambda$max=370 nm) was 0.25.

The optical recording medium sample #22 thus prepared was set to the data recording and reproducing apparatus which was used in Example 1, and data was recorded on the optical recording medium sample #22 in the same manner as in Example 1. When the recorded data was reproduced, with the power of the laser beam fixed to 0.35 mW, the power of the laser beam (optimum laser power) where the R-SER of the reproduction signal became the smallest was 4.8 mW, and the R-SER in this case was $3.8\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #22 after undergoing the high temperature and high humidity test was reproduced and the reproduction signal was evaluated. The R-SER was $1.2\times10^{-3}$.

Thus, the deterioration of R-SER by the high temperature and high humidity test was within 10 times, and the deterioration of the recording and reproducing characteristics of the optical recording medium sample #22, by the high temperature and high humidity test, was well within an acceptable range.

Example 23

An optical recording medium sample #23 was prepared in the same manner as in Example 1 except that the nitrosodiphenylamine compound represented by the above-described structural formula (21) was used in place of the nitrosodiphenylamine compound represented by the above-described structural formula (15) and that the recording layer was formed such that the optical density (the OD value) at the maximum absorption wavelength ($\lambda$max=370 nm) was 0.25.

The optical recording medium sample #23 thus prepared was set to the data recording and reproducing apparatus which was used in Example 1, and data was recorded on the optical recording medium sample #23 in the same manner as in Example 1. When the recorded data was reproduced, with the power of the laser beam fixed to 0.35 mW, the power of the laser beam (optimum laser power) where the R-SER of the reproduction signal became the smallest was 4.9 mW, and the R-SER in this case was $5.4\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #23 after undergoing the high temperature and high humidity test was reproduced and the reproduction signal was evaluated. The R-SER was $9.6\times10^{-4}$.

Thus, the deterioration of R-SER by the high temperature and high humidity test was within 10 times, and the deterioration of the recording and reproducing characteristics of the optical recording medium sample #23, by the high temperature and high humidity test, was well within an acceptable range.

Example 24

An optical recording medium sample #24 was prepared in the same manner as in Example 1 except that the azo metal complex dye having a triazole structure represented by the above-described structural formula (33) was used in place of the azo metal complex dye having a triazole structure represented by the above-described structural formula (31), using the nitrosodiphenylamine compound represented by the above-described structural formula (16) in place of the nitrosodiphenylamine compound represented by the above-described structural formula (15), and that the recording layer was formed such that the optical density (the OD value) at the maximum absorption wavelength ($\lambda$max=379 nm) was 0.25.

The optical recording medium sample #24 thus prepared was set to the data recording and reproducing apparatus which was used in Example 1, and data was recorded on the optical recording medium sample #24 in the same manner as in Example 1. When the recorded data was reproduced, with the power of the laser beam fixed to 0.35 mW, the power of the laser beam (optimum laser power) where the R-SER of the reproduction signal became the smallest was 4.5 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #24 after undergoing the high temperature and high humidity test was reproduced and the reproduction signal was evaluated. The R-SER was $8.6 \times 10^{-4}$.

Thus, the deterioration of R-SER by the high temperature and high humidity test was within 10 times, and the deterioration of the recording and reproducing characteristics of the optical recording medium sample #24, by the high temperature and high humidity test, was well within an acceptable range.

Example 25

An optical recording medium sample #25 was prepared in the same manner as in Example 24 except that the nitrosodiphenylamine compound represented by the above-described structural formula (17) was used in place of the nitrosodiphenylamine compound represented by the above-described structural formula (16) and that the recording layer was formed such that the optical density (the OD value) at the maximum absorption wavelength ($\lambda$max=379 nm) was 0.25.

The optical recording medium sample #25 thus prepared was set to the data recording and reproducing apparatus which was used in Example 1, and data was recorded on the optical recording medium sample #25 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $3.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #25 after undergoing the high temperature and high humidity test was reproduced and the reproduction signal was evaluated. The R-SER was $7.9 \times 10^{-4}$.

Thus, the deterioration of R-SER by the high temperature and high humidity test was within 10 times, and the deterioration of the recording and reproducing characteristics of the optical recording medium sample #25, by the high temperature and high humidity test, was well within an acceptable range.

Example 26

An optical recording medium sample #26 was prepared in the same manner as in Example 25 except that the azo metal complex dye having a triazole structure represented by the above-described structural formula (35) was used in place of the azo metal complex dye having a triazole structure represented by the above-described structural formula (33) and that the recording layer was formed such that the optical density (the OD value) at the maximum absorption wavelength ($\lambda$max=383 nm) was 0.25.

The optical recording medium sample #26 thus prepared was set to the data recording and reproducing apparatus which was used in Example 1, and data was recorded on the optical recording medium sample #26 in the same manner as in Example 1. When the recorded data was reproduced, with the power of the laser beam fixed to 0.35 mW, the power of the laser beam (optimum laser power) where the R-SER of the reproduction signal became the smallest was 4.6 mW, and the R-SER in this case was $6.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #26 after undergoing the high temperature and high humidity test was reproduced and the reproduction signal was evaluated. The R-SER was $8.9 \times 10^{-4}$.

Thus, the deterioration of R-SER by the high temperature and high humidity test was within 10 times, and the deterioration of the recording and reproducing characteristics of the optical recording medium sample #26, by the high temperature and high humidity test, was well within an acceptable range.

Example 27

An optical recording medium sample #27 was prepared in the same manner as in Example 26 except that the nitrosodiphenylamine compound represented by the above-described structural formula (18) was used in place of the nitrosodiphenylamine compound represented by the above-described structural formula (17) and that the recording layer was formed such that the optical density (the OD value) at the maximum absorption wavelength ($\lambda$max=383 nm) was 0.25.

The optical recording medium sample #27 thus prepared was set to the data recording and reproducing apparatus which was used in Example 1, and data was recorded on the optical recording medium sample #27 in the same manner as in Example 1. When the recorded data was reproduced, with the power of the laser beam fixed to 0.35 mW, the power of the laser beam (optimum laser power) where the R-SER of the reproduction signal became the smallest was 4.8 mW, and the R-SER in this case was $5.4 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #27 after undergoing the high temperature and high humidity test was reproduced and the reproduction signal was evaluated. The R-SER was $9.2 \times 10^{-4}$.

Thus, the deterioration of R-SER by the high temperature and high humidity test was within 10 times, and the deterioration of the recording and reproducing characteristics of the optical recording medium sample #27, by the high temperature and high humidity test, was well within an acceptable range.

Example 28

An optical recording medium sample #28 was prepared in the same manner as in Example 27 except that the nitrosodiphenylamine compound represented by the above-described structural formula (19) was used in place of the nitrosodiphenylamine compound represented by the above-described structural formula (18) and that the recording layer was formed such that the optical density (the OD value) at the maximum absorption wavelength ($\lambda$max=383 nm) was 0.25.

The optical recording medium sample #28 thus prepared was set to the data recording and reproducing apparatus which was used in Example 1, and data was recorded on the optical recording medium sample #28 in the same manner as in Example 1. When the recorded data was reproduced, with the power of the laser beam fixed to 0.35 mW, the power of the laser beam (optimum laser power) where the R-SER of the reproduction signal became the smallest was 4.5 mW, and the R-SER in this case was $3.7 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #28 after undergoing the high temperature and high humidity test was reproduced and the reproduction signal was evaluated. The R-SER was $8.3 \times 10^{-4}$.

Thus, the deterioration of R-SER by the high temperature and high humidity test was within 10 times, and the deterioration of the recording and reproducing characteristics of the optical recording medium sample #28, by the high temperature and high humidity test, was well within an acceptable range.

Example 29

An optical recording medium sample #29 was prepared in the same manner as in Example 28 except that the nitrosodiphenylamine compound represented by the above-described structural formula (20) was used in place of the nitrosodiphenylamine compound represented by the above-described structural formula (19) and that the recording layer was formed such that the optical density (the OD value) at the maximum absorption wavelength ($\lambda$max=383 nm) was 0.25.

The optical recording medium sample #29 thus prepared was set to the data recording and reproducing apparatus which was used in Example 1, and data was recorded on the optical recording medium sample #29 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $5.4 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #29 after undergoing the high temperature and high humidity test was reproduced and the reproduction signal was evaluated. The R-SER was $8.5 \times 10^{-4}$.

Thus, the deterioration of R-SER by the high temperature and high humidity test was within 10 times, and the deterioration of the recording and reproducing characteristics of the optical recording medium sample #29, by the high temperature and high humidity test, was well within an acceptable range.

Example 30

An optical recording medium sample #30 was prepared in the same manner as in Example 7 except that the nitrosodiphenylamine compound represented by the above-described structural formula (15) was used in place of the nitrosodiphenylamine compound represented by the above-described structural formula (21) and that the recording layer was formed such that the optical density (the OD value) at the maximum absorption wavelength ($\lambda$max=381 nm) was 0.25.

The optical recording medium sample #30 thus prepared was set to the data recording and reproducing apparatus which was used in Example 1, and data was recorded on the optical recording medium sample #30 in the same manner as in Example 1. When the recorded data was reproduced, with the power of the laser beam fixed to 0.35 mW, the power of the laser beam (optimum laser power) where the R-SER of the reproduction signal became the smallest was 4.6 mW, and the R-SER in this case was $4.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #30 after undergoing the high temperature and high humidity test was reproduced and the reproduction signal was evaluated. The R-SER was $9.3 \times 10^{-4}$.

Thus, the deterioration of R-SER by the high temperature and high humidity test was within 10 times, and the deterioration of the recording and reproducing characteristics of the optical recording medium sample #30, by the high temperature and high humidity test, was well within an acceptable range.

Example 31

An optical recording medium sample #31 was prepared in the same manner as in Example 7 except that the nitrosodiphenylamine compound represented by the above-described structural formula (13) was used in place of the nitrosodiphenylamine compound represented by the above-described structural formula (21) and that the recording layer was formed such that the optical density (the OD value) at the maximum absorption wavelength ($\lambda$max=381 nm) was 0.25.

The optical recording medium sample #31 thus prepared was set to the data recording and reproducing apparatus which was used in Example 1, and data was recorded on the optical recording medium sample #31 in the same manner as in Example 1. The recorded data was reproduced, with the power of the laser beam fixed to 0.35 mW, and the reproduction signal was evaluated. The power of the laser beam (optimum laser power) where the R-SER of the reproduction signal became the smallest was 4.7 mW, and the R-SER in this case was $3.5 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #31 after undergoing the high temperature and high humidity test was reproduced and the reproduction signal was evaluated. The R-SER was $1.1 \times 10^{-3}$.

Thus, the deterioration of R-SER by the high temperature and high humidity test was within 10 times, and the deterioration of the recording and reproducing characteristics of the optical recording medium sample #31, by the high temperature and high humidity test, was well within an acceptable range.

Example 32

An optical recording medium sample #32 was prepared in the same manner as in Example 1 except that the azo metal complex dye having a triazole structure represented by the above-described structural formula (41) was used in place of the azo metal complex dye having a triazole structure represented by the above-described structural formula (31), using the nitrosodiphenylamine compound represented by the above-described structural formula (16) in place of the nitrosodiphenylamine compound represented by the above-described structural formula (15), and that the recording layer was formed such that the optical density (the OD value) at the maximum absorption wavelength ($\lambda$max=427 nm) was 0.22.

The optical recording medium sample #32 thus prepared was set to the data recording and reproducing apparatus which was used in Example 1, and data was recorded on the optical recording medium sample #32 in the same manner as in Example 1. When the recorded data was reproduced, with the power of the laser beam fixed to 0.35 mW, the power of the laser beam (optimum laser power) where the R-SER of the reproduction signal became the smallest was 6.2 mW, and the R-SER in this case was $1.2 \times 10^{-3}$.

Further, the high temperature and high humidity test conforming to ISO was conducted; and by using the above-described data recording and reproducing apparatus, with the power of the laser beam fixed to 0.35 mW, the data recorded on the optical recording medium sample #32 after undergoing the high temperature and high humidity test was reproduced and the reproduction signal was evaluated. The R-SER was $7.4 \times 10^{-3}$.

Thus, the deterioration of R-SER by the high temperature and high humidity test was within 10 times, and the deterioration of the recording and reproducing characteristics of the optical recording medium sample #32, by the high temperature and high humidity test, was well within an acceptable range.

Example 33

An optical recording medium sample #33 was prepared in the same manner as in Example 1 except that the azo metal complex dye having a triazole structure represented by the above-described structural formula (43) was used in place of the azo metal complex dye having a triazole structure represented by the above-described structural formula (31), using the nitrosodiphenylamine compound represented by the above-described structural formula (17) in place of the nitrosodiphenylamine compound represented by the above-described structural formula (15), and that the recording layer was formed such that the optical density (the OD value) at the maximum absorption wavelength ($\lambda$max=394 nm) was 0.25.

The optical recording medium sample #33 thus prepared was set to the data recording and reproducing apparatus which was used in Example 1, and data was recorded on the optical recording medium sample #33 in the same manner as in Example 1. When the recorded data was reproduced, with the power of the laser beam fixed to 0.35 mW, the power of the laser beam (optimum laser power) where the R-SER of the reproduction signal became the smallest was 5.0 mW, and the R-SER in this case was $7.9 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #33 after undergoing the high temperature and high humidity test was reproduced and the reproduction signal was evaluated. The R-SER was $8.6 \times 10^{-4}$.

Thus, the deterioration of R-SER by the high temperature and high humidity test was within 10 times, and the deterioration of the recording and reproducing characteristics of the optical recording medium sample #33, by the high temperature and high humidity test, was well within an acceptable range.

Example 34

An optical recording medium sample #34 was prepared in the same manner as in Example 1 except that 20 wt % of the nitrosodiphenylamine compound represented by the above-described structural formula (11) was added to 80 wt % of the azo metal complex dye having a triazole structure represented by the above-described structural formula (31) and that the recording layer was formed such that the optical density (the OD value) at the maximum absorption wavelength ($\lambda$max=370 nm) was 0.25.

The optical recording medium sample #34 thus prepared was set to the data recording and reproducing apparatus which was used in Example 1, and data was recorded on the optical recording medium sample #34 in the same manner as in Example 1. When the recorded data was reproduced, with the power of the laser beam fixed to 0.35 mW, the power of the laser beam (optimum laser power) where the R-SER of the reproduction signal became the smallest was 5.1 mW, and the R-SER in this case was $9.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #34 after undergoing the high temperature and high humidity test was reproduced and the reproduction signal was evaluated. The R-SER was $1.4 \times 10^{-3}$.

Thus, the deterioration of R-SER by the high temperature and high humidity test was within 10 times, and the deterioration of the recording and reproducing characteristics of the optical recording medium sample #34, by the high temperature and high humidity test, was well within an acceptable range.

Example 35

An optical recording medium sample #35 was prepared in the same manner as in Example 1 except that 5 wt % of the nitrosodiphenylamine compound represented by the above-described structural formula (11) was added to 95 wt % of the azo metal complex dye having a triazole structure represented by the above-described structural formula (31) and that the recording layer was formed such that the optical density (the OD value) at the maximum absorption wavelength ($\lambda$max=370 nm) was 0.25.

The optical recording medium sample #35 thus prepared was set to the data recording and reproducing apparatus which was used in Example 1, and data was recorded on the optical recording medium sample #35 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $3.6\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #35 after undergoing the high temperature and high humidity test was reproduced and the reproduction signal was evaluated. The R-SER was $6.2\times10^{-4}$.

Thus, the deterioration of R-SER by the high temperature and high humidity test was within 10 times, and the deterioration of the recording and reproducing characteristics of the optical recording medium sample #35, by the high temperature and high humidity test, was well within an acceptable range.

Example 36

An optical recording medium sample #36 was prepared in the same manner as in Example 1 except that 1 wt % of the nitrosodiphenylamine compound represented by the above-described structural formula (11) was added to 99 wt % of the azo metal complex dye having a triazole structure represented by the above-described structural formula (31) and that the recording layer was formed such that the optical density (the OD value) at the maximum absorption wavelength ($\lambda$max=370 nm) was 0.25.

The optical recording medium sample #36 thus prepared was set to the data recording and reproducing apparatus which was used in Example 1, and data was recorded on the optical recording medium sample #36 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $4.2\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium sample #36 after undergoing the high temperature and high humidity test was reproduced and the reproduction signal was evaluated. The R-SER was $3.9\times10^{-3}$.

Thus, the deterioration of R-SER by the high temperature and high humidity test was within 10 times, and the deterioration of the recording and reproducing characteristics of the optical recording medium sample #36, by the high temperature and high humidity test, was well within an acceptable range.

Comparative Example 1

An optical recording medium comparative sample #1 was prepared in the same manner as in Example 1 except that the addition of the nitrosodiphenylamine compound represented by the above-described structural formula (15) was not made.

The optical recording medium comparative sample #1 thus prepared was set to the data recording and reproducing apparatus which was used in Example 1, and data was recorded on the optical recording medium comparative sample #1 in the same manner as in Example 1. When the recorded data was reproduced, with the power of the laser beam fixed to 0.35 mW, the power of the laser beam (optimum laser power) where the R-SER of the reproduction signal became the smallest was 4.8 mW, and the R-SER in this case was $3.8\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #1 after undergoing the high temperature and high humidity test was reproduced and the reproduction signal was evaluated. The R-SER was $1.2\times10^{-2}$.

Thus, the deterioration of R-SER by the high temperature and high humidity test was more than 10 times. Therefore, it was found that the recording and reproducing characteristics of the optical recording medium comparative sample #1 would deteriorate remarkably when stored in an environment of high temperature and humidity for a long period of time.

Comparative Example 2

An optical recording medium comparative sample #2 was prepared in the same manner as in Example 2 except that the addition of the nitrosodiphenylamine compound represented by the above-described structural formula (15) was not made.

The optical recording medium comparative sample #2 thus prepared was set to the data recording and reproducing apparatus which was used in Example 1, and data was recorded on the optical recording medium comparative sample #2 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $5.2\times10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #2 after undergoing the high temperature and high humidity test was reproduced and the reproduction signal was evaluated. The R-SER was $9.8\times10^{-3}$.

Thus, the deterioration of R-SER by the high temperature and high humidity test was more than 10 times. Therefore, it was found that the recording and reproducing characteristics of the optical recording medium comparative sample #2 would deteriorate remarkably when stored in an environment of high temperature and humidity for a long period of time.

Comparative Example 3

An optical recording medium comparative sample #3 was prepared in the same manner as in Example 3 except that the addition of the nitrosodiphenylamine compound represented by the above-described structural formula (15) was not made.

The optical recording medium comparative sample #3 thus prepared was set to the data recording and reproducing apparatus which was used in Example 1, and data was recorded on the optical recording medium comparative sample #3 in the same manner as in Example 1. When the recorded data was reproduced, with the power of the laser beam fixed to 0.35 mW, the power of the laser beam (optimum laser power)

where the R-SER of the reproduction signal became the smallest was 5.1 mW, and the R-SER in this case was $3.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #3 after undergoing the high temperature and high humidity test was reproduced and the reproduction signal was evaluated. The R-SER was $8.2 \times 10^{-3}$.

Thus, the deterioration of R-SER by the high temperature and high humidity test was more than 10 times. Therefore, it was found that the recording and reproducing characteristics of the optical recording medium comparative sample #3 would deteriorate remarkably when stored in an environment of high temperature and humidity for a long period of time.

Comparative Example 4

An optical recording medium comparative sample #4 was prepared in the same manner as in Example 4 except that the addition of the nitrosodiphenylamine compound represented by the above-described structural formula (15) was not made.

The optical recording medium comparative sample #4 thus prepared was set to the data recording and reproducing apparatus which was used in Example 1, and data was recorded on the optical recording medium comparative sample #4 in the same manner as in Example 1. When the recorded data was reproduced, with the power of the laser beam fixed to 0.35 mW, the power of the laser beam (optimum laser power) where the R-SER of the reproduction signal became the smallest was 4.8 mW, and the R-SER in this case was $2.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #4 after undergoing the high temperature and high humidity test was reproduced and the reproduction signal was evaluated. The R-SER was $7.8 \times 10^{-3}$.

Thus, the deterioration of R-SER by the high temperature and high humidity test was more than 10 times. Therefore, it was found that the recording and reproducing characteristics of the optical recording medium comparative sample #4 would deteriorate remarkably when stored in an environment of high temperature and humidity for a long period of time.

Comparative Example 5

An optical recording medium comparative sample #5 was prepared in the same manner as in Example 5 except that the addition of the nitrosodiphenylamine compound represented by the above-described structural formula (15) was not made.

The optical recording medium comparative sample #5 thus prepared was set to the data recording and reproducing apparatus which was used in Example 1, and data was recorded on the optical recording medium comparative sample #5 in the same manner as in Example 1. When the recorded data was reproduced, with the power of the laser beam fixed to 0.35 mW, the power of the laser beam (optimum laser power) where the R-SER of the reproduction signal became the smallest was 4.9 mW, and the R-SER in this case was $4.0 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #5 after undergoing the high temperature and high humidity test was reproduced and the reproduction signal was evaluated. The R-SER was $9.2 \times 10^{-3}$.

Thus, the deterioration of R-SER by the high temperature and high humidity test was more than 10 times. Therefore, it was found that the recording and reproducing characteristics of the optical recording medium comparative sample #5 would deteriorate remarkably when stored in an environment of high temperature and humidity for a long period of time.

Comparative Example 6

An optical recording medium comparative sample #6 was prepared in the same manner as in Example 6 except that the addition of the nitrosodiphenylamine compound represented by the above-described structural formula (15) was not made.

The optical recording medium comparative sample #6 thus prepared was set to the data recording and reproducing apparatus which was used in Example 1, and data was recorded on the optical recording medium comparative sample #6 in the same manner as in Example 1. When the recorded data was reproduced, with the power of the laser beam fixed to 0.35 mW, the power of the laser beam (optimum laser power) where the R-SER of the reproduction signal became the smallest was 4.6 mW, and the R-SER in this case was $2.6 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #6 after undergoing the high temperature and high humidity test was reproduced and the reproduction signal was evaluated. The R-SER was $1.1 \times 10^{-2}$.

Thus, the deterioration of R-SER by the high temperature and high humidity test was more than 10 times. Therefore, it was found that the recording and reproducing characteristics of the optical recording medium comparative sample #6 would deteriorate remarkably when stored in an environment of high temperature and humidity for a long period of time.

Comparative Example 7

An optical recording medium comparative sample #7 was prepared in the same manner as in Example 7 except that the addition of the nitrosodiphenylamine compound represented by the above-described structural formula (15) was not made.

The optical recording medium comparative sample #7 thus prepared was set to the data recording and reproducing apparatus which was used in Example 1, and data was recorded on the optical recording medium comparative sample #7 in the same manner as in Example 1. When the recorded data was reproduced, with the power of the laser beam fixed to 0.35 mW, the power of the laser beam (optimum laser power) where the R-SER of the reproduction signal became the smallest was 4.3 mW, and the following R-SER in this case was $3.1 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #7 after undergoing the high temperature and high humidity test was reproduced and the reproduction signal was evaluated. The R-SER was $9.6 \times 10^{-3}$.

Thus, the deterioration of R-SER by the high temperature and high humidity test was more than 10 times. Therefore, it was found that the recording and reproducing characteristics of the optical recording medium comparative sample #7 would deteriorate remarkably when stored in an environment of high temperature and humidity for a long period of time.

Comparative Example 8

An optical recording medium comparative sample #8 was prepared in the same manner as in Example 8 except that the addition of the nitrosodiphenylamine compound represented by the above-described structural formula (15) was not made.

The optical recording medium comparative sample #8 thus prepared was set to the data recording and reproducing apparatus which was used in Example 1, and data was recorded on the optical recording medium comparative sample #8 in the same manner as in Example 1. When the recorded data was reproduced, with the power of the laser beam fixed to 0.35 mW, the power of the laser beam (optimum laser power) where the R-SER of the reproduction signal became the smallest was 4.7 mW, and the R-SER in this case was $4.0 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #8 after undergoing the high temperature and high humidity test was reproduced and the reproduction signal was evaluated. The R-SER was $8.5 \times 10^{-3}$.

Thus, the deterioration of R-SER by the high temperature and high humidity test was more than 10 times. Therefore, it was found that the recording and reproducing characteristics of the optical recording medium comparative sample #8 would deteriorate remarkably when stored in an environment of high temperature and humidity for a long period of time.

Comparative Example 9

An optical recording medium comparative sample #9 was prepared in the same manner as in Example 9 except that the addition of the nitrosodiphenylamine compound represented by the above-described structural formula (15) was not made.

The optical recording medium comparative sample #9 thus prepared was set to the data recording and reproducing apparatus which was used in Example 1, and data was recorded on the optical recording medium comparative sample #9 in the same manner as in Example 1. When the recorded data was reproduced, with the power of the laser beam fixed to 0.35 mW, the power of the laser beam (optimum laser power) where the R-SER of the reproduction signal became the smallest was 4.5 mW, and the R-SER in this case was $3.8 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #9 after undergoing the high temperature and high humidity test was reproduced and the reproduction signal was evaluated. The R-SER was $7.8 \times 10^{-3}$.

Thus, the deterioration of R-SER by the high temperature and high humidity test was more than 10 times. Therefore, it was found that the recording and reproducing characteristics of the optical recording medium comparative sample #9 would deteriorate remarkably when stored in an environment of high temperature and humidity for a long period of time.

Comparative Example 10

An optical recording medium comparative sample #10 was prepared in the same manner as in Example 10 except that the addition of the nitrosodiphenylamine compound represented by the above-described structural formula (15) was not made.

The optical recording medium comparative sample #10 thus prepared was set to the data recording and reproducing apparatus which was used in Example 1, and data was recorded on the optical recording medium comparative sample #10 in the same manner as in Example 1. When the recorded data was reproduced, with the power of the laser beam fixed to 0.35 mW, the power of the laser beam (optimum laser power) where the R-SER of the reproduction signal became the smallest was 5.3 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #10 after undergoing the high temperature and high humidity test was reproduced and the reproduction signal was evaluated. The R-SER was $8.2 \times 10^{-3}$.

Thus, the deterioration of R-SER by the high temperature and high humidity test was more than 10 times. Therefore, it was found that the recording and reproducing characteristics of the optical recording medium comparative sample #10 would deteriorate remarkably when stored in an environment of high temperature and humidity for a long period of time.

Comparative Example 11

An optical recording medium comparative sample #11 was prepared in the same manner as in Example 11 except that the addition of the nitrosodiphenylamine compound represented by the above-described structural formula (15) was not made.

The optical recording medium comparative sample #11 thus prepared was set to the data recording and reproducing apparatus which was used in Example 1, and data was recorded on the optical recording medium comparative sample #11 in the same manner as in Example 1. When the recorded data was reproduced, with the power of the laser beam fixed to 0.35 mW, the power of the laser beam (optimum laser power) where the R-SER of the reproduction signal became the smallest was 6.1 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #11 after undergoing the high temperature and high humidity test was reproduced and the reproduction signal was evaluated. The R-SER was $9.8 \times 10^{-3}$.

Thus, the deterioration of R-SER by the high temperature and high humidity test was more than 10 times. Therefore, it was found that the recording and reproducing characteristics of the optical recording medium comparative sample #11 would deteriorate remarkably when stored in an environment of high temperature and humidity for a long period of time.

Comparative Example 12

An optical recording medium comparative sample #12 was prepared in the same manner as in Example 12 except that the addition of the nitrosodiphenylamine compound represented by the above-described structural formula (15) was not made.

The optical recording medium comparative sample #12 thus prepared was set to the data recording and reproducing apparatus which was used in Example 1, and data was recorded on the optical recording medium comparative sample #12 in the same manner as in Example 1. When the recorded data was reproduced, with the power of the laser beam fixed to 0.35 mW, the power of the laser beam (optimum laser power) where the R-SER of the reproduction signal became the smallest was 5.5 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #12 after undergoing the high temperature and high humidity test was reproduced and the reproduction signal was evaluated. The R-SER was $1.1 \times 10^{-2}$.

Thus, the deterioration of R-SER by the high temperature and high humidity test was more than 10 times. Therefore, it was found that the recording and reproducing characteristics of the optical recording medium comparative sample #12 would deteriorate remarkably when stored in an environment of high temperature and humidity for a long period of time.

Comparative Example 13

An optical recording medium comparative sample #13 was prepared in the same manner as in Example 13 except that the addition of the nitrosodiphenylamine compound represented by the above-described structural formula (15) was not made.

The optical recording medium comparative sample #13 thus prepared was set to the data recording and reproducing apparatus which was used in Example 1, and data was recorded on the optical recording medium comparative sample #13 in the same manner as in Example 1. When the recorded data was reproduced, with the power of the laser beam fixed to 0.35 mW, the power of the laser beam (optimum laser power) where the R-SER of the reproduction signal became the smallest was 5.6 mW, and the R-SER in this case was $4.2 \times 10^{-4}$.

Further, the high temperature and high humidity test conforming to ISO was conducted; and by using the above-described data recording and reproducing apparatus, with the power of the laser beam fixed to 0.35 mW, the data recorded on the optical recording medium comparative sample #13 after undergoing the high temperature and high humidity test was reproduced and the reproduction signal was evaluated. The R-SER was $2.4 \times 10^{-2}$.

Thus, the deterioration of R-SER by the high temperature and high humidity test was more than 10 times. Therefore, it was found that the recording and reproducing characteristics of the optical recording medium comparative sample #13 would deteriorate remarkably when stored in an environment of high temperature and humidity for a long period of time.

From Examples 1 to 36 and Comparative Examples 1 to 13, it was found that in cases where the optical recording medium comparative samples #1 to #13, in which the recording layer 12 was formed by the azo metal complex dye having a triazole structure represented by either of the above-described structural formulae (31) to (43) without the addition of the nitrosodiphenylamine compound represented by either of the above-described structural formulae (11) to (21), the recording and reproducing characteristics deteriorated remarkably when stored in an environment of high temperature and humidity for a long period of time; and in contrast, in cases where the optical recording medium samples #1 to #36, in which the recording layer was formed with the additive represented by either of the above-described structural formulae (11) to (21) added to the azo metal complex dye having a triazole structure represented by either of the above-described structural formulae (31) to (43), were stored in the environment of high temperature and humidity for a long period of time, the deterioration of the recording and reproducing characteristics thereof was well within an acceptable range.

The present invention is not limited to the above described embodiments and example variations and modifications may be made within the scope of the claimed invention, and it should be appreciated that they are also encompassed in the present invention.

For example, in the above-described embodiments and Examples, the light transmission layer 14 is formed by coating the surface of the protective layer 13 with the photocurable resin, which is cured by irradiating ultraviolet rays or radiation, by spin coating method to form the coated film, and by irradiating the coated film with ultraviolet rays or radiation to cure the coated film. However, the light transmission layer 14 is not necessarily formed in this way. The light transmission layer 14 may be formed by attaching a light transmission resin film to the surface of the protective layer 13 using an adhesive.

Further, in the above-described embodiments and Examples, the optical recording medium 1 has a structure in which the reflective layer 11, the recording layer 12, the protective layer 13, the light transmission layer 14 and the hard coat layer 15 are laminated in this order on the substrate 10. The optical recording medium 1 may also have a protection layer formed by a dielectric, between the reflective layer 11 and the recording layer 12.

DESCRIPTION OF SYMBOLS 1 recordable optical recording medium
5 laser beam
10 substrate
10a guide groove
11 reflective layer
12 recording layer
13 protective layer
14 light transmission layer
15 hard coat layer

The invention claimed is:
1. A recordable optical recording medium comprising:
a substrate having thereon at least a reflective layer;
a recording layer formed by an organic dye;
and
a light transmission layer;
the organic dye having
an azo metal complex dye and
an additive added to the azo metal complex dye;
the azo metal complex dye having a triazole structure represented by the following general formula:

[Chemical formula 45]

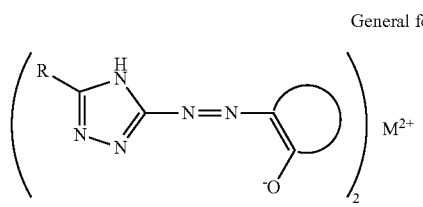

General formula (1)

in which R is a functional group selected from the group consisting of hydrogen, $C_1$-$C_4$ alkyl, benzyl, diethylamido, halogen, trifluoromethyl, methoxy, thiomethyl and N,N-diethyl carbamoyl;

M is a metal atom selected from the group consisting of nickel, cobalt and copper;

the cyclic part of the general formula (1) is made of carbon, oxygen and hydrogen atoms; and the cyclic part of the general formula (1) has a structure represented by one of following general formulae (a) to (j), (l), and (q):

[Chemical formula 47]

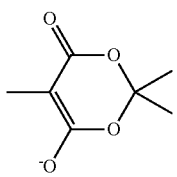

General formula (a)

[Chemical formula 48]

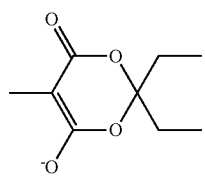

General formula (b)

[Chemical formula 49]

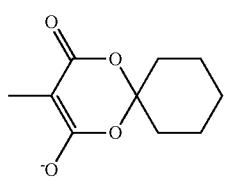

General formula (c)

[Chemical formula 50]

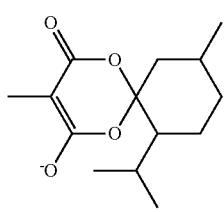

General formula (d)

[Chemical formula 51]

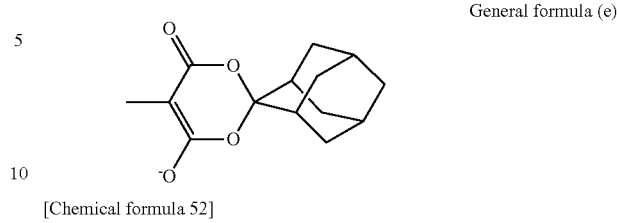

General formula (e)

[Chemical formula 52]

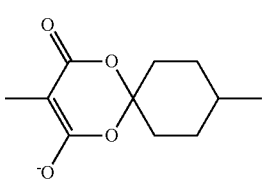

General formula (f)

[Chemical formula 53]

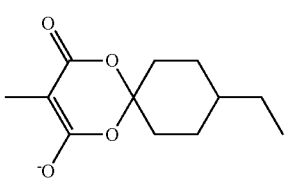

General formula (g)

[Chemical formula 54]

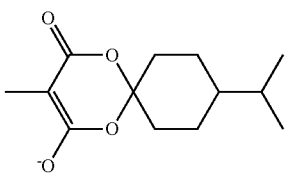

General formula (h)

[Chemical formula 55]

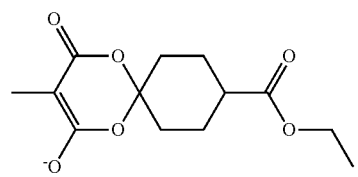

General formula (i)

[Chemical formula 56]

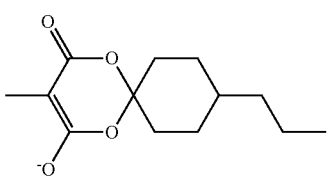

General formula (j)

[Chemical formula 58]

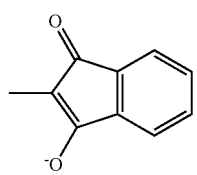

General formula (l)

[Chemical formula 63]

General formula (q)

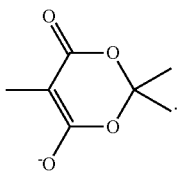

2. The recordable optical recording medium according to claim 1, wherein
the additive, added to the azo metal complex dye having a triazole structure, is a nitrosodiphenylamine compound represented by the following general formula (10):

[Chemical formula 64]

General formula (10)

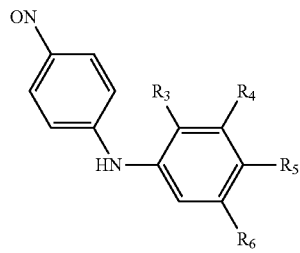

in which R3 to R6 independently are functional groups selected from the group consisting of hydrogen, $C_1$-$C_2$ alkyl, halogen, trifluoromethyl, dimethylamino, acetamido and nitro.

3. The recordable optical recording medium according to claim 1, wherein
the additive, added to the azo metal complex dye having a triazole structure, is a nitrosodiphenylamine compound selected from the group consisting of the nitrosodiphenylamine compounds represented by the following structural formulae (11) to (21):

[Chemical formula 65]

Structural formula (11)

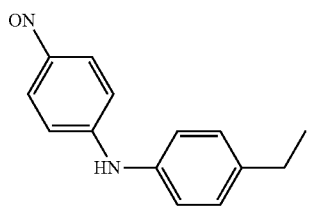

[Chemical formula 66]

Structural formula (12)

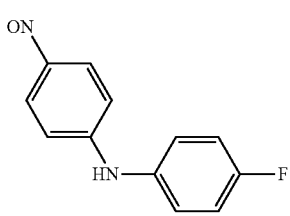

[Chemical formula 67]

Structural formula (13)

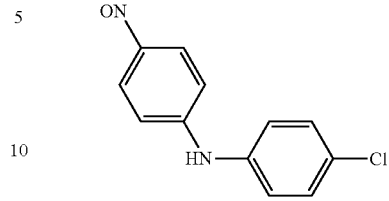

[Chemical formula 68]

Structural formula (14)

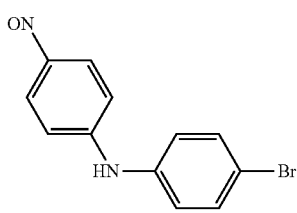

[Chemical formula 69]

Structural formula (15)

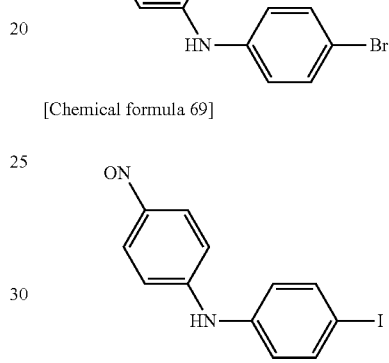

[Chemical formula 70]

Structural formula (16)

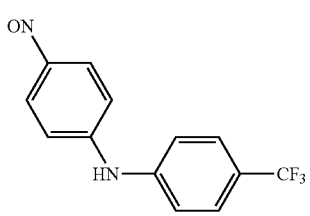

[Chemical formula 71]

Structural formula (17)

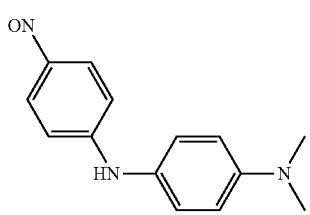

[Chemical formula 72]

Structural formula (18)

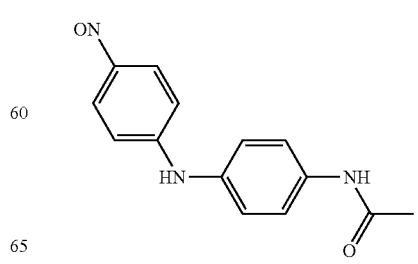

[Chemical formula 73]

Structural formula (19)

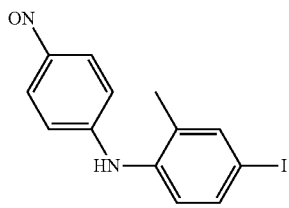

[Chemical formula 74]

Structural formula (20)

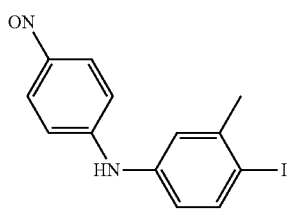

[Chemical formula 75]

Structural formula (21)

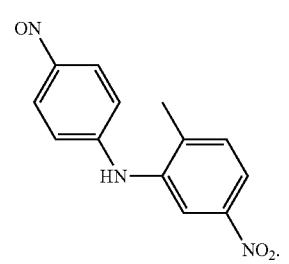

4. The recordable optical recording medium according to claim 1, wherein
the azo metal complex dye having a triazole structure has a molecular structure selected from the molecular structures represented by the following structural formulae (31) to (39), (41), and (43):

[Chemical formula 76]

Structural formula (31)

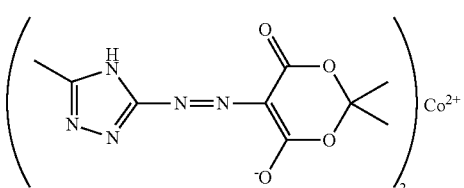

[Chemical formula 77]

Structural formula (32)

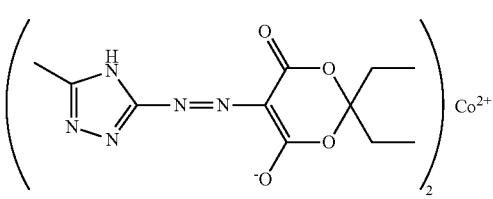

[Chemical formula 78]

Structural formula (33)

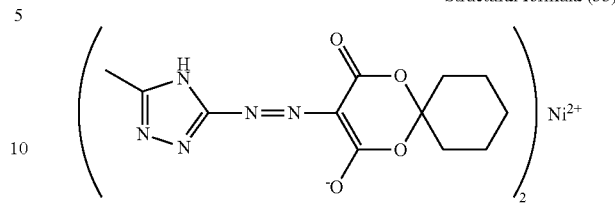

[Chemical formula 79]

Structural formula (34)

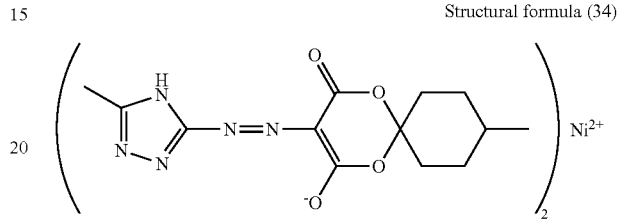

[Chemical formula 80]

Structural formula (35)

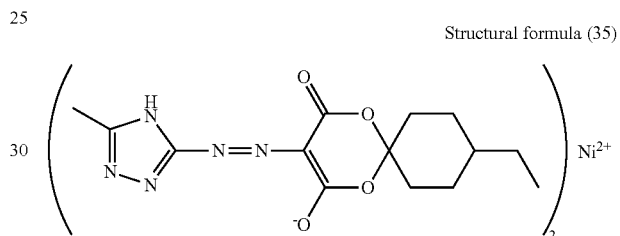

[Chemical formula 81]

Structural formula (36)

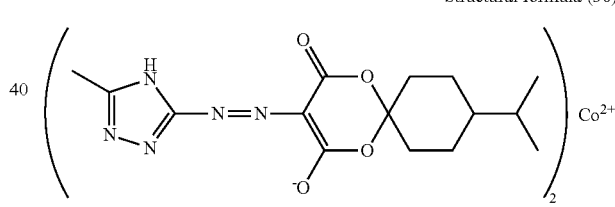

[Chemical formula 82]

Structural formula (37)

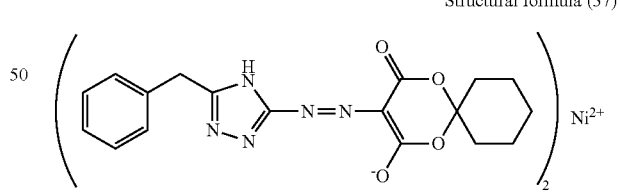

[Chemical formula 83]

Structural formula 38

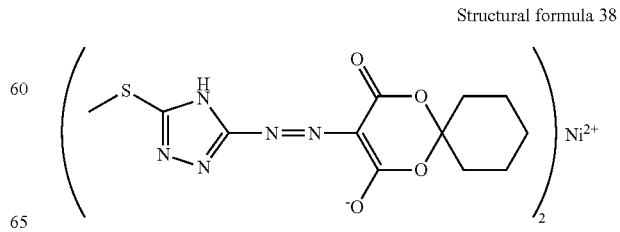

-continued

[Chemical formula 84]

Structural formula (39)

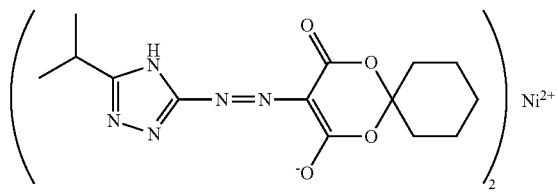

[Chemical formula 86]

Structural formula (41)

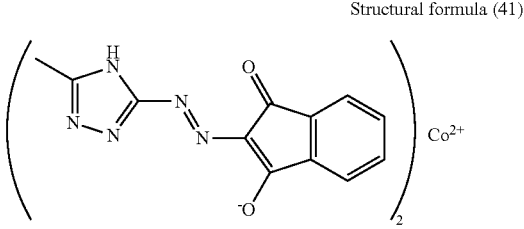

[Chemical formula 88]

Structural formula (43)

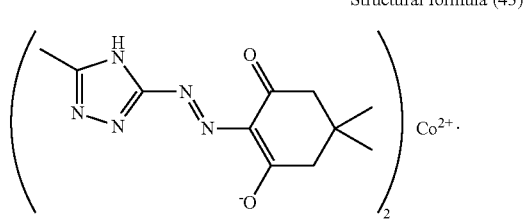

5. The recordable optical recording medium according to claim 1, wherein
the amount of the additive to be added to the azo metal complex dye having a triazole structure represented by the general formula (1) is 1 wt % to 20 wt % based on the total weight, of the azo metal complex dye having a triazole structure and the additive contained in the recording layer.

6. The recordable optical recording medium according to claim 5, wherein
the amount of the additive to be added to the azo metal complex dye having a triazole structure represented by the general formula (1) is 2 wt % to 10 wt % based on the total weight, of the azo metal complex dye having a triazole structure and the additive contained in the recording layer.

7. The recordable optical recording medium according to claim 1, wherein the light transmission layer is made by a single layer.

8. The recordable optical recording medium according to claim 7, wherein the light transmission layer made by a single layer has elastic modulus of from 40 MPa to 10000 MPa at 25° C.

9. The recordable optical recording medium according to claim 1, further comprising:
a hard coat layer formed on a surface of the light transmission layer.

10. The recordable optical recording medium according to claim 1, further comprising:
a protective layer formed by a dielectric material, between the recording layer and the light transmission layer.

* * * * *